(12) United States Patent
Schonberg et al.

(10) Patent No.: US 11,880,504 B2
(45) Date of Patent: Jan. 23, 2024

(54) AUTOMATIC PREFERENCE QUANTIFICATION OF DISPLAYED OBJECTS BASED ON EYE TRACKER DATA

(71) Applicant: Ramot at Tel-Aviv University Ltd., Tel-Aviv (IL)

(72) Inventors: Tom Schonberg, Tel-Aviv (IL); Michal Gabay, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 17/954,409

(22) Filed: Sep. 28, 2022

(65) Prior Publication Data

US 2023/0102371 A1    Mar. 30, 2023

Related U.S. Application Data

(60) Provisional application No. 63/249,397, filed on Sep. 28, 2021.

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 2027/0187* (2013.01)

(58) Field of Classification Search
CPC ............... G06F 3/013; G02B 27/0093; G02B 2027/0187; G06Q 30/0201; G06Q 30/0254; G06Q 30/0269; G06Q 50/22; G06V 40/18
See application file for complete search history.

(56) References Cited

U.S. PATENT DOCUMENTS 10,027,888 B1 *   7/2018   Mackraz ................ G06V 10/25
10,353,462 B2 *   7/2019   Yu ........................... G06F 3/013
(Continued)

OTHER PUBLICATIONS

Aracena, C. et al, "Neural Networks for Emotion Recognition Based on Eye Tracking Data"; 2015 IEEE International Conference on Systems, Man, and Cybernetics, pp. 2632-2637, Oct. 9-12, 2015. DOI 10.1109/SMC.2015.460.
(Continued)

*Primary Examiner* — Dmitriy Bolotin
(74) *Attorney, Agent, or Firm* — The Roy Gross Law Firm, LLC; Roy Gross

(57) ABSTRACT

A system including a display, an eye tracker, and a processor that executes the following: operate the display to present multiple objects to a user; operate the eye tracker to track an eye gaze of the user during the presentation of the multiple objects; calculate an estimated user preference of each of the multiple objects, by performing at least one of: (a) calculating a measure of central tendency of distances from a center of the respective object to points of the eye gaze on the respective object, wherein a higher measure of central tendency of the distances indicates a stronger user preference and vice versa, and (b) calculating a measure of central tendency of speeds of transition between temporally-consecutive ones of the points of the eye gaze, wherein a higher measure of central tendency of the speeds indicates a stronger user preference and vice versa.

20 Claims, 9 Drawing Sheets

(56) References Cited

U.S. PATENT DOCUMENTS

| | | | | |
|---|---|---|---|---|
| 2011/0182472 | A1* | 7/2011 | Hansen | G06F 3/013 |
| | | | | 382/103 |
| 2015/0138066 | A1* | 5/2015 | Seok | G06F 3/013 |
| | | | | 345/156 |
| 2015/0205362 | A1* | 7/2015 | Park | G06F 3/04815 |
| | | | | 345/156 |
| 2015/0220144 | A1* | 8/2015 | Ashbrook | G06F 3/013 |
| | | | | 345/156 |
| 2018/0106999 | A1* | 4/2018 | Wilson | G06F 3/0304 |
| 2019/0073025 | A1* | 3/2019 | Schmidt | G06F 3/013 |
| 2019/0212827 | A1* | 7/2019 | Kin | G02B 27/0172 |
| 2020/0110271 | A1* | 4/2020 | Komogortsev | G02B 27/017 |
| 2020/0124844 | A1* | 4/2020 | Ortiz Egea | G06F 3/013 |
| 2020/0218347 | A1* | 7/2020 | Jiang | G02B 27/0179 |
| 2021/0405744 | A1* | 12/2021 | Walker | G06F 3/013 |
| 2022/0138145 | A1* | 5/2022 | DiRienzo | G06Q 50/01 |
| | | | | 707/667 |
| 2023/0102371 | A1* | 3/2023 | Schonberg | G06F 3/013 |
| | | | | 345/156 |

OTHER PUBLICATIONS

Bermúdez i Badia, S. et al, "Towards Emotionally-Adaptive Virtual Reality for Mental Health Applications"; IEEE Journal of Biomedical and Health Informatics, pp. 2168-2194, Oct. 31, 2018. DOI 10.1109/JBHI.2018.2878846.

Freeman, D. et al, "Automated psychological therapy using virtual reality (VR) for patients with persecutory delusions: Study protocol for a single-blind parallel-group randomised controlled trial (Thrive)"; Trials, 20(1), Jan. 29, 2019. https://doi.org/10.1186/s13063-019-3198-6.

Graham, D. J. et al, "Predictors of nutrition label viewing during food purchase decision making: An eye tracking Investigation"; Public Health Nutrition, 15(2), 189-197, Jul. 7, 2011. doi: 10.1017/S1368980011001303.

Jacob, R. J. K. et al, "Eye Tracking in Human-Computer Interaction and Usability Research. Ready to Deliver the Promises"; In The Mind's Eye: Cognitive and Applied Aspects of Eye Movement Research (pp. 531-553). Elsevier Inc., Jan. 2003.

Krajbich, I. et al, "Multialternative drift-diffusion model predicts the relationship between visual fixations and choice in value-based decisions"; Proc Natl Acad Sci U S A, 108(33), 13852-13857, Jul. 6, 2011. www.pnas.org/cgi/doi/10.1073/pnas.1101328108.

Krajbich, I. et al, "Visual fixations and the computation and comparison of value in simple choice"; Nature Neuroscience, 13(10), pp. 1292-1298, Feb. 10, 2011. doi: 10.1038/nn.2635.

Lanatà, A. et al, "Eye gaze patterns in emotional pictures"; Journal of Ambient Intelligence and Humanized Computing, 1(6), pp. 705-715, Jul. 19, 2012. https://doi.org/10.1007/s12652-012-0147-6. DOI 10.1007/s12652-012-0147-6.

Lappi, O. Eye movements in the wild: Oculomotor control, gaze behavior Neuroscience and Biobehavioral Reviews, 69, pp. 49-68, Jun. 8, 2016. http://dx.doi.org/doi:10.1016/j.neubiorev.2016.06.006.

Marín-Morales, J. et al, "Affective computing in virtual reality: emotion recognition from brain and heartbeat dynamics using wearable sensors"; Scientific reports; Aug. 1-15, 2018. DOI:10.1038/s41598-018-32063-4.

Meißner, M. et al, "Combining virtual reality and mobile eye tracking to provide a naturalistic experimental environment for shopper research"; Journal of Business Research; vol. 100, pp. 445-458, Sep. 17, 2017. http://dx.doi.org/10.1016/j.jbusres.2017.09.028.

Oren, S et al, "Item Features Interact With Item Category in Their Influence on Preferences"; Frontiers in Psychology, vol. 11, Jul. 23, 2020. doi: 10.3389/fpsyg.2020.00988.

Ravyse, W. S et al, "Success factors for serious games to enhance learning: a systematic review"; Virtual Reality, vol. 21(1), pp. 31-58, Sep. 13, 2016. DOI 10.1007/s10055-016-0298-4.

Seamon, J. G. et al, "A mere exposure effect for transformed three-dimensional objects: Effects of reflection, size, or color changes on affect and recognition" Memory & Cognition, vol. 25(3), pp. 367-374, May 1997. https://doi.org/10.3758/BF03211292.

Shimojo, S. et al, "Gaze bias both reflects and influences preference"; Nature Neuroscience, vol. 6(12), pp. 1317-1322, Dec. 2003. DOI: 10.1038/nn1150.

Susskind, J. M. et al, "Expressing fear enhances sensory acquisition"; Nature Neuroscience, vol. 11(7), pp. 843-850, Jun. 15, 2008. doi:10.1038/nn.2138.

Tavakoli, H. R. et al, "Predicting the valence of a scene from observers' eye movements"; Plos One, vol. 10(9), pp. 1-19, Sep. 25, 2015. doi: 10.1371/journal.pone.0138198.

Zajonc RB, "Attitudinal Effects Of Mere Exposure"; Journal of Personality and Social Psychology; vol. 9: pp. 1-27, Jun. 1968.

Zajonc, R. B., "Mere exposure: A gateway to the subliminal"; Current Directions in Psychological Science; vol. 10(6), pp. 224-228, Dec. 1, 2001. DOI: 10.1111/1467-8721.00154.

Zajonc, R. B. et al, "Affective and Cognitive Factors in Preferences"; Journal of Consumer Research, vol. 9(2), p. 123, Sep. 1982.

Gabay, M., and Schonberg, T., "Eye-tracking in the assessment of subjective experience measures in virtual reality environment," Presentation given at the SNE 2021 Annual Meeting, Sep. 29-Oct. 1, 2021.

Gabay, M., and Schonberg, T., "Eye-tracking in the assessment of subjective experience measures in virtual reality environment," Abstract book of the SNE 2021 Annual Meeting, pp. 46-47, Sep. 29-Oct. 1, 2021.

Gabay, M., and Schonberg, T., "Eye-tracking in the assessment of subjective experience measures in virtual reality environment," online at https://www.youtube.com/watch?v=UpaH-oPy9lo, Video made available for the SNE 2021 nnual Meeting, Sep. 29-Oct. 1, 2021.

* cited by examiner

AUTOMATIC PREFERENCE QUANTIFICATION OF DISPLAYED OBJECTS BASED ON EYE TRACKER DATA

CROSS REFERENCE TO RELATED APPLICATIONS

This application claims the benefit of priority to U.S. 63/249,397 entitled "PASSIVE IDENTIFICATION OF PREFERENCE OF INDIVIDUAL ITEMS BASED ON CALCULATED EYE-GAZE MEASURES IN VIRTUAL REALITY" filed on Sep. 28, 2021. The contents of this application are incorporated by reference in their entirety.

BACKGROUND

The invention relates to the field of digital biomarkers, specifically eye tracking-based digital biomarkers.

Eye tracking is a process performed by an eye tracker device, which measures eye positions and eye movement. From these, the process of eye tracking can determine the point of gaze (where the eye is looking) and/or the motion of the eye relative to the head.

Various types of eye trackers exist. Most commonly, eye trackers record images of the eye from which its position is determined. Other types of eye trackers use search coils or are based on electrooculography.

Eye trackers are used in research, psychology, marketing, and as an input device for human-computer interaction. Eye trackers are also used for rehabilitative and assistive applications, such as for people with limited limb control.

Past research has shown that eye tracking data can sometimes be useful as a digital biomarker, aiding in the diagnosis or screening of various physiological and psychological conditions.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a system comprising: a display; an eye tracker; at least one hardware processor; and a non-transitory computer-readable storage medium having program code embodied therewith, the program code executable by the at least one hardware processor to: operate the display to present multiple objects to a user, operate the eye tracker to track an eye gaze of the user during the presentation of the multiple objects, and calculate an estimated user preference of each of the multiple objects, by performing at least one of: (a) calculating a measure of central tendency of distances from a center of the respective object to points of the eye gaze on the respective object, wherein a higher measure of central tendency of the distances indicates a stronger user preference and vice versa, and (b) calculating a measure of central tendency of speeds of transition between temporally-consecutive ones of the points of the eye gaze, wherein a higher measure of central tendency of the speeds indicates a stronger user preference and vice versa.

Another embodiment is directed to a computer-implemented method comprising: automatically operating a display to present multiple objects to a user; automatically operating an eye tracker to track an eye gaze of the user during the presentation of the multiple objects; and automatically calculating an estimated user preference of each of the multiple objects, by performing at least one of: (a) calculating a measure of central tendency of distances from a center of the respective object to points of the eye gaze on the respective object, wherein a higher measure of central tendency of the distances indicates a stronger user preference and vice versa, and (b) calculating a measure of central tendency of speeds of transition between temporally-consecutive ones of the points of the eye gaze, wherein a higher measure of central tendency of the speeds indicates a stronger user preference and vice versa.

A further embodiment is directed to a computer program product comprising a non-transitory computer-readable storage medium having program code embodied therewith, the program code executable by at least one hardware processor to: operate a display to present multiple objects to a user, operate an eye tracker to track an eye gaze of the user during the presentation of the multiple objects, and calculate an estimated user preference of each of the multiple objects, by performing at least one of: (a) calculating a measure of central tendency of distances from a center of the respective object to points of the eye gaze on the respective object, wherein a higher measure of central tendency of the distances indicates a stronger user preference and vice versa, and (b) calculating a measure of central tendency of speeds of transition between temporally-consecutive ones of the points of the eye gaze, wherein a higher measure of central tendency of the speeds indicates a stronger user preference and vice versa.

In some embodiments, the method further comprises, or the program code is further executable by the at least one hardware processor to: run a computer game; operate the display to present video output of the computer game, wherein the multiple objects are part of the computer game; and personalize the computer game to the user by utilizing the estimated user preference of each of the multiple objects to select, offer, or present those of the multiple objects having a high estimated user preference relative to other ones of the multiple objects.

In some embodiments, the method further comprises, or the program code is further executable by the at least one hardware processor to: run a computerized learning software; operate the display to present video output of the computerized learning software, wherein the multiple objects are part of the computerized learning software; and personalize the computerized learning software to the user by utilizing the estimated user preference of each of the multiple objects to select, offer, or present those of the multiple objects having a high estimated user preference relative to other ones of the multiple objects.

In some embodiments, the method further comprises, or the program code is further executable by the at least one hardware processor to: run a computerized psychotherapy software; operate the display to present video output of the computerized psychotherapy software, wherein the multiple objects are part of the computerized psychotherapy software; and personalize the computerized psychotherapy software to the user by utilizing the estimated user preference of each of the multiple objects to select, offer, or present those of the multiple objects having a high estimated user preference relative to other ones of the multiple objects.

In some embodiments, each of the measures of central tendency of (a) and (b) is selected from the group consisting of: mean, median, and mode.

In some embodiments, the display is selected from the group consisting of: a three-dimensional display, and a two-dimensional display.

In some embodiments, the objects are selected from the group consisting of: human characters, non-human characters, and inanimate items.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
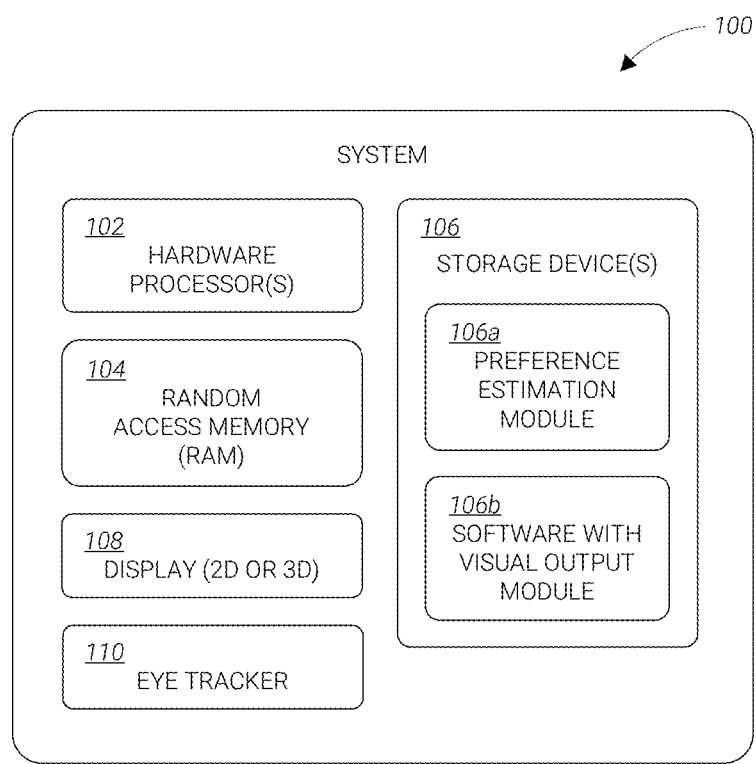
FIG. 1 is a block diagram of an exemplary system for estimating user preference of multiple objects, and optionally for personalizing and/or otherwise enhancing software with visual output based on the estimated user preference.

Disclosed herein is a method, a system, and a computer program product for estimating user preference of objects that are displayed to the user in the course of a running computer program or a video. Advantageously, the estimated user preference may be calculated using one or more measures that are based upon eye tracking data of the user, collected while the objects are displayed and the user gazes at them. Accordingly, these measures may be regarded as digital biomarkers that are indicative of certain mental aspects of the user.

A first exemplary measure is a measure of central tendency (e.g., a mean, a median, or a mode) of distances from a center of the respective object to points of the eye gaze on the respective object. In this example, a higher measure of central tendency of the distances indicates stronger user preference, and vice versa.

A second and a third exemplary measures, related to the first one, are the minimal and maximal distances, respectively, out of the aforementioned distances (from the center of the respective object to the points of the eye gaze on the respective object). The 'minimal' distance may also be more broadly defined as the distance at a relatively low percentile of the aforementioned distances, such as a percentile equal to or lower than the $15^{th}$; similarly, the 'maximal' distance may also be more broadly defined as the distance at a relatively high percentile of the aforementioned distances, such as a percentile equal to or larger than the 85th. In the second and third examples, a higher minimal/maximal distance indicates stronger user preference, and vice versa.

A fourth exemplary measure, also related to the first one, is a measure of central tendency (e.g., a mean, a median, or a mode) of the differences in distance to the center (the same distances calculated for the first exemplary measure) between every two temporally-consecutive points of the eye gaze. In the fourth example, a higher central tendency indicates stronger user preference, and vice versa.

A fifth and a sixth exemplary measures, related to the fourth one, are the minimal and maximal distance differences, respectively, out of the aforementioned time differences (between the points of the eye gaze). The 'minimal' distance difference may also be more broadly defined as the distance difference at a relatively low percentile of the aforementioned distance differences, such as a percentile equal to or lower than the $15^{th}$; similarly, the 'maximal' distance difference may also be more broadly defined as the distance difference at a relatively high percentile of the aforementioned distance differences, such as a percentile equal to or larger than the $85^{th}$. In the fifth and sixth examples, a higher minimal/maximal distance difference indicates stronger user preference, and vice versa.

A seventh exemplary measure is a measure of central tendency (e.g., a mean, a median, or a mode) of speeds of transition between temporally-consecutive ones of the points of the eye gaze, wherein a higher measure of central tendency of the speeds indicates a stronger user preference, and vice versa.

It should be noted that in this disclosure, the term "measure of central tendency" does not refer solely to the mean, median, or mode, but also to approximations of each of these. For example, a measure of central tendency calculated for each of the aforementioned seven measures may be any of the mean, median, or mode, ±10%.

One of the advantages of the above measures is that they allow quantifying user preference of a certain object based on a temporal sequence of gaze points that are all located on that specific object. This is different, for example, from some conventional eye tracking methods that deduce user preference of an object or a portion of a displayed scene (e.g., a portion of a displayed web page) by analyzing the manner in which the gaze of the user travels intermittently between different objects (or different portions of the displayed scene). Here, in contrast, the disclosed measures may allow quantifying the user preference even when the user gazes only at a single object for a certain duration, during which the gaze travels only between points located on that same object.

The estimated user preference may be calculated for objects that are displayed as part of a digital video, a computer game, a computerized learning software, a computerized psychotherapy software, etc. (collectively referred to herein as "software with visual output"), in order to personalize and/or otherwise enhance these in an automatic manner and in real time, without necessitating explicit user feedback.

The eye tracking-based measures and the various possible uses of the estimated user preference are discussed below in greater detail.

Reference is now made to FIG. 1, which shows a block diagram of an exemplary system 100 for estimating user preference of multiple objects, and optionally for personalizing and/or otherwise enhancing software with visual output based on the estimated user preference.

System 100 may include one or more hardware processor(s) 102, a random-access memory (RAM) 104, one or more non-transitory computer-readable storage device(s) 106, a display 108, and an eye tracker 110.

Storage device(s) 106 may have stored thereon program instructions and/or components configured to operate hardware processor(s) 102 so that the hardware processor(s), in turn, may operate display 108 and eye tracker 110.

The program instructions may include one or more software modules, such as a preference estimation module 106a and a software with visual output module 106b. The software components may include an operating system having various software components and/or drivers for controlling and managing general system tasks (e.g., memory management, storage device control, power management, etc.), and facilitating communication between various hardware and software components.

System 100 may operate by loading instructions of modules 106a-b into RAM 104 as they are being executed by processor(s) 102. The instructions of software with visual output module 106b may cause system 100 to run (also "execute") a computer game, a computerized learning software, a computerized psychotherapy software, etc., or to play a video—all while presenting visual output of these on display 108. The instructions of preference estimation module 106a, in turn, may collect data from eye tracker 110 while objects are being presented to the user as part of the visual output, so as to track the eye gaze of the user over the visual output. Module 106a may further calculate an estimated user preference of each of the objects based on certain specific measures deduced from data collected from eye tracker 110. Then, module 106b may utilize the estimated user preference to personalize and/or otherwise enhance the computer game, computerized learning software, computerized psychotherapy software, digital video, etc.

Display 108 may be a two-dimensional (2D) display or a three-dimensional (3D) display. Examples of a 2D display include a digital flat or curved screen (such as a computer screen or a television screen), a projector configured to project imagery on an empty, passive, screen, etc. Examples of a 3D display include a wearable virtual reality (VR) display, a wearable augmented reality (AR) display, or a combination of two-dimensional presentation of 3D-ready imagery over a 2D display together with 3D stereoscopic glasses that enable their wearer to experience the 3D-ready imagery in 3D.

Eye tracker 110 may be a conventional device configured to track the point of gaze of one or both eyes of a user. Examples of such devices include those which use an image sensor to track eye movement, those which use an eye-attached implement (e.g., a scleral contact lens equipped with magnetic field coils), and those which use electrodes attached to the skin around the eye to measure electric potential.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

The program instructions (also "program code") of modules 106a-b are now discussed with reference to the flowchart of FIG. 2, which illustrates a method 200 for estimating user preference of objects that are displayed to the user in the framework of a software with visual output, and for personalizing and/or otherwise enhancing the software with visual output based on the estimated user preference.

Steps of method 200 may either be performed in the order they are presented or in a different order (or even in parallel), as long as the order allows for a necessary input to a certain step to be obtained from an output of an earlier step. In addition, the steps of this method are performed automatically (e.g., by system 100 of FIG. 1), unless specifically stated otherwise.

In a step 202, a display (such as display 108 of FIG. 1) may be operated to present multiple objects to a user, for example in the framework of running a software with visual output. This step may be executed by module 106b of FIG. 1. The multiple objects may be presented simultaneously (in the same scene), or separately (successively, in different scenes). In case multiple objects are presented simultaneously, then the calculation of user preference of each of these objects may be based only upon the user's consecutive gaze points on each individual object, as further discussed below.

The objects may be of one or a variety of types, such as human characters, non-human characters (e.g., animal characters, fictitious characters), inanimate items (e.g., household items, items common in computer games such as weapons, shields, first aid kits, etc.), and/or the like. Method 200, as further discussed below, may be able to deduce that the user prefers a certain human character over another, prefers a human character wearing certain clothing and/or holding equipment over the same human character wearing other clothing and/or holding other equipment, prefers a certain human character over a certain animal character, or prefers a certain shield carried by its avatar over a different shield, to name a few examples. Optionally, one or more of the objects may be animated, namely—they may move in relation to the scene they are in, and/or their organs/parts may move relative to one another, while the eye tracking data is recorded. For example, a human character may walk along the scene, jump, move its hands, change its facial expression, and/or the like.

The term "object," as referred to herein, may refer either to an entire entity (e.g., the entire body of human character) or to a sub-unit of an entity (e.g., the face of a human character). An object may be detected, identified, and/or its borders defined, using a conventional object detection algorithm. Therefore, for example, the object detection algorithm may be configured and directed to detect a whole entity (e.g., the entire body of human character) or just a sub-unit of an entity (e.g., the face of that human character)— each serving as an "object" at will.

Optionally, the presentation of the multiple objects is not accompanied (either before or during presentation) with any prompt to the user to evaluate his or her preference of them. Rather, the user is enabled to observe these objects in a natural manner, free of the influence of any instruction that might inadvertently cause the user to gaze differently at these objects. Accordingly, method 200 may be referred to as a "passive" method to estimate user preference of objects, because this estimation is done passively without any user knowledge and involvement.

In a step 204, an eye tracker (such as eye tracker 110 of FIG. 1) may be operated to track the eye gaze of the user during the presentation of the multiple objects of step 202. Namely, steps 202 and 204 may be performed at least partially concurrently. Step 204 may be executed by module 106a of FIG. 1. One or both eyes may be tracked. The tracking may yield eye tracking data that include gaze points and their associated time stamps. A gaze point, as known in the art, is a parameter indicating where the eye is looking at. When the eye tracker is calibrated with the display, the gaze point may be expressed as a location on the display at which the eye is looking at a certain time (indicated by the time stamp). When a 2D display is concerned, a gaze point may be expressed by 2D cartesian coordinates (x, y), whereas when a 3D display is concerned, a gaze point may be expressed by 3D cartesian coordinates (x, y, and z, with z being the 'depth' of that point in the presented scene, or the theoretical distance of the point from the user's eye or from another plane of reference).

Figure 3:
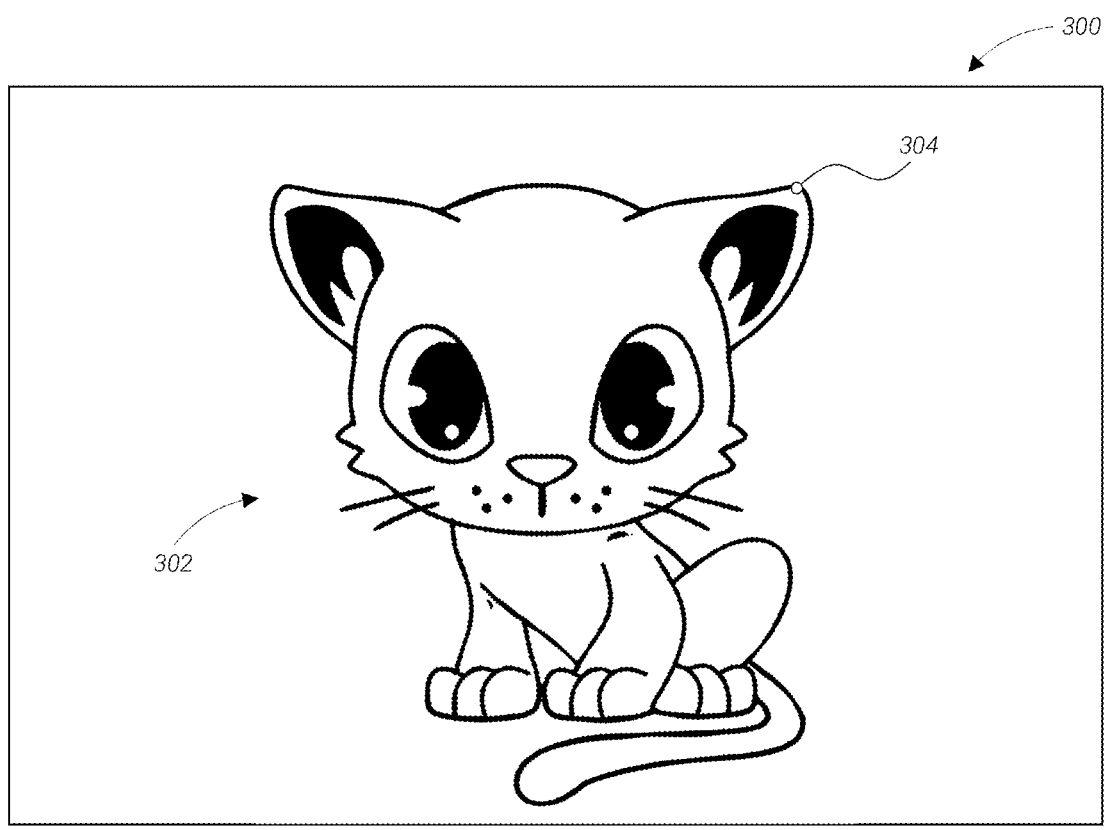
FIG. 3 is a semi-pictorial illustration of a displayed scene.

By way of example, reference is now made to FIG. 3, showing a scene 300 presented on the display, including a cat cartoon (regarded as the 'object') 302. When a 2D display is concerned, the tip 304 of the cat's left ear may be indicated by 2D cartesian coordinates (such as 1000, 850), whereas when a 3D display is concerned, the tip of the ear may be indicated by 3D cartesian coordinates (such as 1000, 850, 3000). Assuming, for example, that the eye tracking data includes a gaze point of (1000, 850, 3000) with an associated time stamp of 00:01:05.030 (in the format hh:mm:ss.ms), we know that the user gazed at the tip 304 of the cat's right ear at 1 minute, 5 seconds, and 30 milliseconds into the eye tracking session. The number of gaze points recorded by the time tracker per second depends on the sampling rate of the eye tracker, which is commonly between 25 and 2000 Hz (but may also exceed this range). For example, for a 50 Hz eye tracker, a gaze point may be recorded every 20 milliseconds. No gaze points may be recorded when the eye blinks (or some "null" gaze points may be recorded at such times). It should be noted that eye tracker data may sometimes include inaccurate time stamps, which denote the times the gaze points were recorded at the computer associated with the eye tracker, instead of the actual times these gaze points were sampled. This phenomenon may yield, for example, time stamps which are not uniform with respect to time increments. Accordingly, instead of relying of the time stamps, it is possible to deduce the actual sampling time of each point simply according to the sampling rate of the eye tracker: if the eye tracker is known to sample at 120 Hz, for example, then it can be safely assumed that the gaze points are 8⅓ milliseconds apart.

Figure 2:
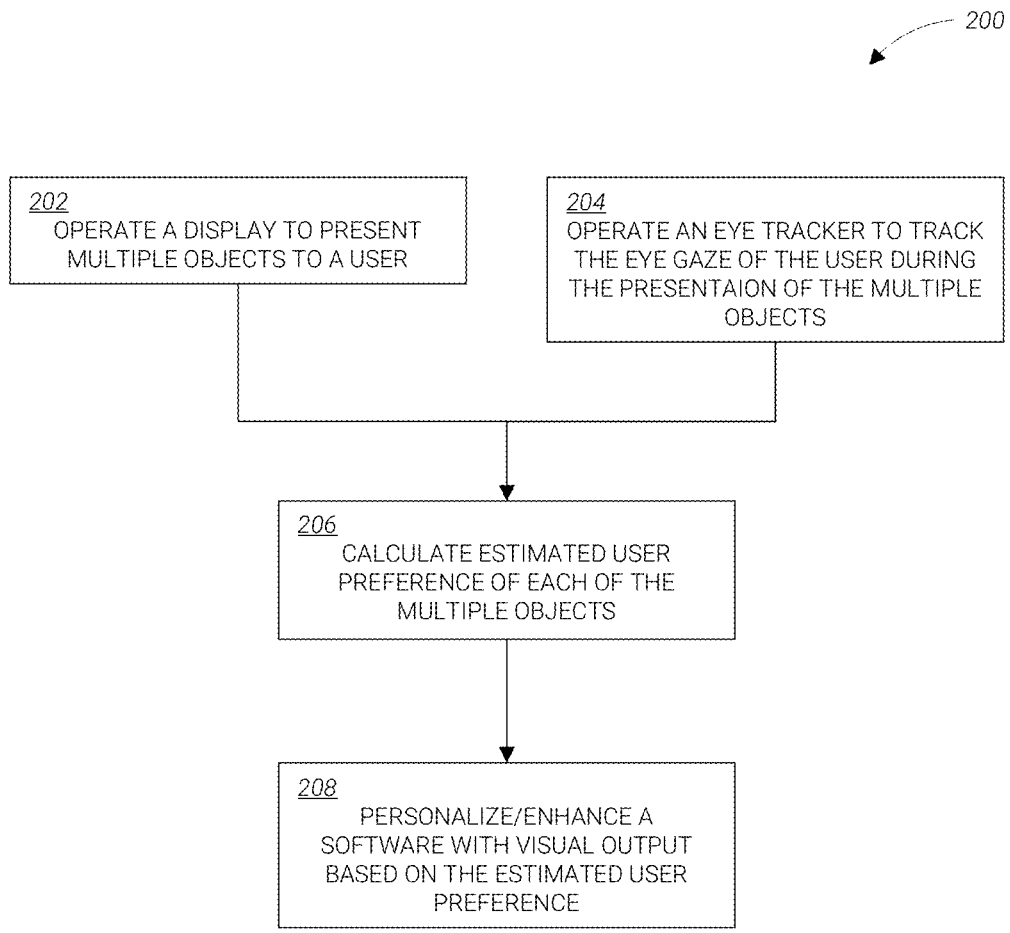
FIG. 2 is a flowchart of a method for estimating user preference of objects that are displayed to the user in the framework of a software with visual output, and for personalizing and/or otherwise enhancing the software with visual output based on the estimated user preference.

Reference is now made back to FIG. 2. In a step 206, an estimated user preference of each of the multiple objects may be calculated (or "quantified"). This step may be executed by module 106a of FIG. 1. The term "user preference," as referred to herein, may relate to a numerical value (also a "score") that quantifies how much the user likes, favors, and/or feels pleasant with respect to the respective object.

Extensive experimentation by the inventors revealed that the following seven eye gaze measures, which one would not have intuitively associated with human preference, are surprisingly correlated with user preference of presented objects:

First, a measure of central tendency (e.g., a mean, a median, or a mode) of distances (Euclidean distances) from a center of the respective object to points of the eye gaze on the respective object. A higher measure of central tendency of the distances (namely, a greater overall distance between the points and the center of the object) indicates stronger user preference, and vice versa.

Figure 4:
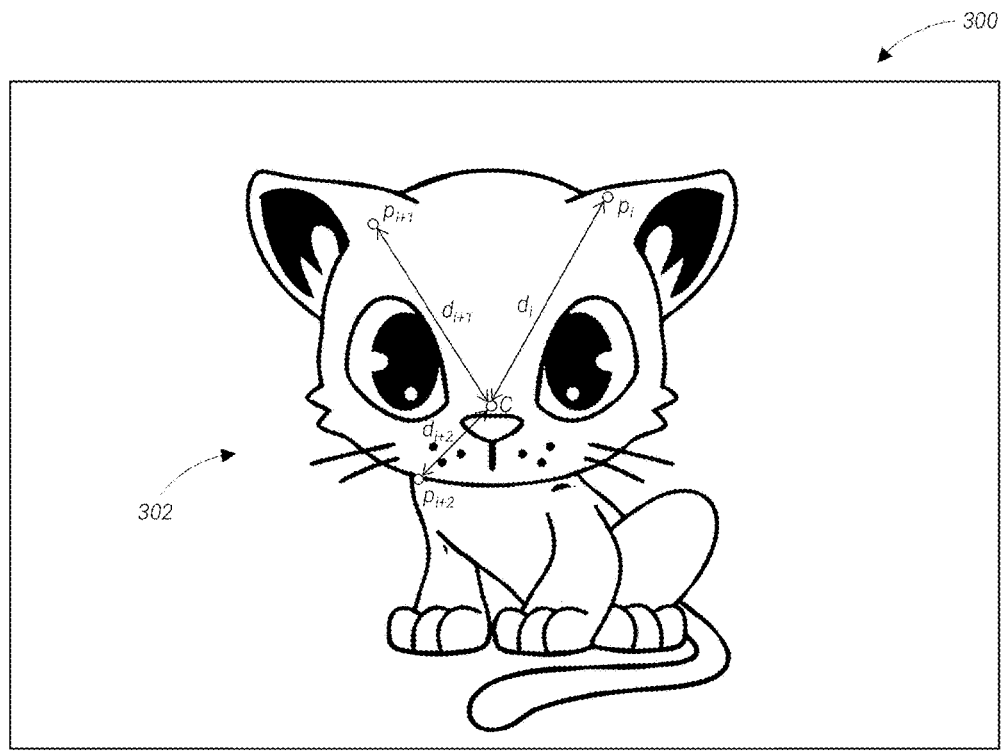
FIG. 4 is a semi-pictorial illustration of the displayed scene of FIG. 3, additionally illustrating a measure of central tendency of distances from a center of an object to points of eye gaze on the object.

Reference is now made to FIG. 4 which illustrates this measure graphically, using the exemplary scene 300 of FIG. 3. For simplicity, let us assume that the user's gaze over cat 302 included just three gaze points (that are positioned, of course, on the cat—namely, at the same coordinates the cat is presented on the display), denoted $p_i$, $p_{i+1}$, and $p_{i+2}$. Immediately before and after these gaze points were recorded, the user was gazing at points which are not on cat 302 (at least one such point before, and at least on such point after).

The center of cat 302 is denoted C in the figure, and the Euclidean distances between each of points $p_i$, $p_{i+1}$, and $p_{i+2}$ and C are denoted $d_i$, $d_{i+1}$, and $d_{i+2}$, respectively. The first measure is therefore the mean, median, or mode of the Euclidean distances $d_i$, $d_{i+1}$, and $d_{i+2}$. This central tendency measure of the distances may be conventionally calculated based on the cartesian coordinates of each of points $p_i$, $p_{i+1}$, and $p_{i+2}$ and C. Assume, for example, that $d_i=55$, $d_{i+1}=45$, and $d_{i+2}=20$. The mean of $d_i$, $d_{i+1}$, and $d_{i+2}$ is 60.

Note that, even though the points are denoted $p_i$, $p_{i+1}$, and $p_{i+2}$, their temporal sequence may be irrelevant for calculation of the first measure. Such sequence may be relevant for one or more of the other measures, as discussed further below.

Figure 5:
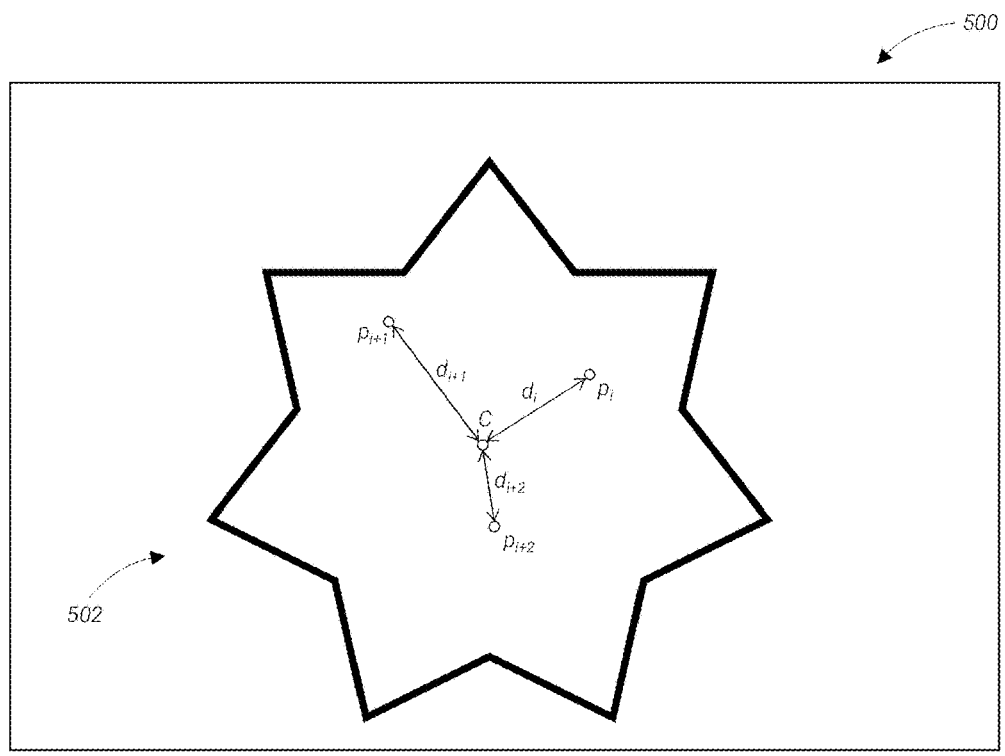
FIG. 5 is a semi-pictorial illustration of another displayed scene, additionally illustrating a measure of central tendency of distances from a center of an object to points of eye gaze on the object.

For comparison, reference is now made to FIG. 5, which illustrates a different scene 500 with three gaze points over a different object, this time a 7-point star 502. The scenes of FIGS. 4 and 5 are shown at the same scale, with the objects at essentially the same depth in the scene—to allow for easy visual comparison. It can be readily seen that, for star 502, the distances between its center and three gaze points are shorter than those in FIG. 4, indicating that the user preference of cat 302 is greater than his or her preference of star 502. For example, if in FIG. 5 $d_i=25$, $d_{i+1}=30$, and $d_{i+2}=20$, then their mean is 25—considerably lower than the mean of the distances in FIG. 4, which was 60.

One way to look at the differences between the first measure calculated for cat 302 and the one calculated for star 502 is that the user visually scanned a more extended area of the object he or she preferred—the cat; he or she visually scanned a smaller area of the less preferable object—the star.

The first measure may similarly be calculated for one or more additional objects presented to the user, so that the user preference of all objects may be quantified and, if desired, ranked in an ascending or descending order.

It should be noted that the center of an object, for purposes of calculation of the first measure, may be automatically calculated using a conventional object detection algorithm, followed by a calculation of the center of a bounding box provided customarily by the object detection algorithm. That bounding box may be three-dimensional (volumetric) in case a 3D display is used and 3D objects are presented, or be two-dimensional in case a 3D display is used and 3D objects are presented. It is also possible to predefine that the center of an object will not be exactly the center of its bounding box, but rather at a certain distance and direction from the center of the bounding box.

The second and third measures may be related to the first one: they are the minimal and maximal distances, respectively, out of the aforementioned distances (from the center of the respective object to the points of the eye gaze on the respective object). A minimal/maximal distance indicates stronger user preference, and vice versa. The 'minimal' distance may also be more broadly defined as the distance at a relatively low percentile of the aforementioned distances, such as a percentile equal to or lower than the 15th; similarly, the 'maximal' distance may also be more broadly defined as the distance at a relatively high percentile of the aforementioned distances, such as a percentile equal to or larger than the $85^{th}$. With reference to the example shown in FIG. 4, the second measure (the minimal distance) may be 20 ($d_{i+2}$), which is the shortest distance out of $d_i$, $d_{i+1}$, and $d_{i+2}$; similarly, the third measure (the maximal distance) may be 55 ($d_i$), which is the shortest distance out of $d_i$, $d_{i+1}$, and $d_{i+2}$. In the second and third measures, a higher minimal/maximal distance indicates stronger user preference, and vice versa. So, for instance, if the minimal/maximal distance for a certain object is compared to the minimal/maximal distance for another object, the more preferred object is the one having the higher minimal/maximal distance of the two.

The fourth measure may also be related to the first one: given the aforementioned distances from the center of the respective object to points of the eye gaze on the respective object, the fourth measure is a measure of central tendency (e.g., a mean, a median, or a mode) of the differences in distance to the center between every two temporally-consecutive points of the eye gaze. With reference to the example shown in FIG. 4, let us assume that points $p_i$, $p_{i+1}$, and $p_{i+2}$ are temporally consecutive (recorded at time stamps i, i+1, and i+2). For example:

|  | Point coordinates | Time stamp | Distance from center |
|---|---|---|---|
| $p_i$ | 200, 300, 700 | 00:01:45.000 | 55 |
| $p_{i+1}$ | 150, 290, 705 | 00:01:45.100 | 45 |
| $p_{i+2}$ | 165, 200, 690 | 00:01:45.300 | 20 |

Let us consider the first pair of consecutive points, $p_i$ and $p_{i+1}$. Their distances from the center of the object are 55 and 45, respectively. The difference between these distances is 10. Let us now consider the second pair of consecutive points, $p_{i+1}$ and $p_{i+2}$. Their distances from the center of the object are 45 and 20, respectively. The difference between these distances is 25. Accordingly, the fourth measure may be a measure of central tendency of the values 10 and 25—for example 17.5; in this simplistic example, because there are only two values, the mean, median, and mode are all equal to 17.5.

In the fourth measure, therefore, a higher central tendency indicates stronger user preference, and vice versa. So, for instance, if the mean difference for a certain object is compared to the mean difference for another object, the more preferred object is the one having the higher mean difference of the two.

The fifth and sixth measures may be related to the fourth one: they are the minimal and maximal differences, respectively, out of the aforementioned distance differences (differences in distance to the center between every two temporally-consecutive points of the eye gaze). The 'minimal' distance difference may also be more broadly defined as the distance difference at a relatively low percentile of the aforementioned distance differences, such as a percentile equal to or lower than the 15th; similarly, the 'maximal' distance difference may also be more broadly defined as the distance difference at a relatively high percentile of the aforementioned distance differences, such as a percentile equal to or larger than the $85^{th}$. Referring to the preceding table with exemplary points, the minimal distance difference is 10 (between points $p_i$ and $p_{i+1}$), and the maximal distance difference is 25 (between points $p_{i+1}$ and $p_{i+2}$). In the fifth and sixth measures, therefore, a higher minimal/maximal distance difference indicates stronger user preference, and vice versa. So, for instance, if the minimal/maximal distance difference for a certain object is compared to the minimal/maximal distance difference for another object, the more preferred object is the one having the higher minimal/maximal time difference of the two.

The seventh eye gaze measure is a measure of central tendency (e.g., a mean, a median, or a mode) of speeds of transition between temporally-consecutive points of the eye gaze on the respective object. A higher measure of central tendency of the speeds (namely, an overall faster travel of the gaze from point to point) indicates a stronger user preference, and vice versa.

Figure 6:
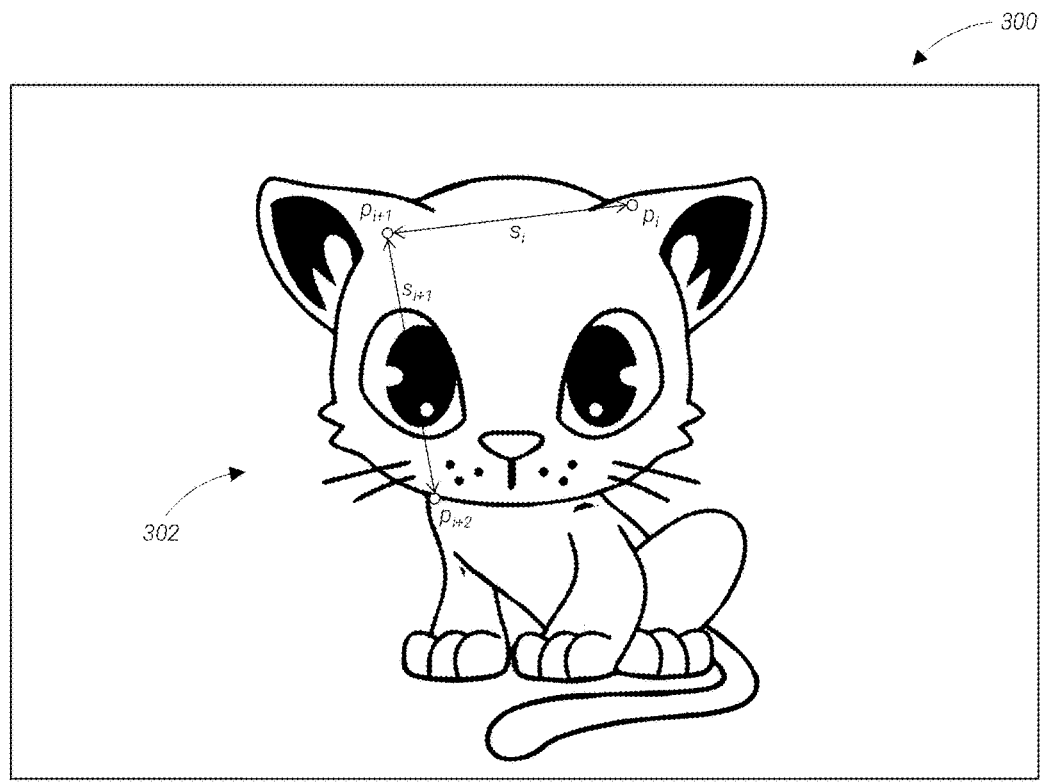
FIG. 6 is a semi-pictorial illustration of the displayed scene of FIG. 3, additionally illustrating a measure of central tendency of speeds of transition between temporally-consecutive points of eye gaze on an object.

Reference is now made to FIG. 6 which illustrates this seventh measure graphically, in a similar manner to FIG. 4. For simplicity, let us assume again that the user's gaze over cat 302 included just three gaze points (that are positioned, of course, on the cat— namely, at the same coordinates the cat is presented on the display), denoted $p_i$, $p_{i+1}$, and $p_{i+2}$, and having the following coordinates and time stamps:

|  | Point coordinates | Time stamp |
|---|---|---|
| $p_i$ | 200, 300, 700 | 00:01:45.000 |
| $p_{i+1}$ | 150, 290, 705 | 00:01:45.100 |
| $p_{i+2}$ | 165, 200, 690 | 00:01:45.200 |

Immediately before and after these gaze points were recorded, the user was gazing at points which are not on cat 302 (at least one such point before, and at least on such point after).

The seventh measure is therefore the mean, median, or mode of the speed of transition from $p_i$ to $p_{i+1}$ (that speed denoted $s_i$ in the figure) and from $p_{i+1}$ to $p_{i+2}$ (that speed denoted $s_{i+1}$ in the figure). The speed is customarily calculated as distance (Euclidean distance between the pair of points) divided by time (the difference between their time stamps). The speed may be output in any desired unit, such as in pixels per millisecond, for example.

The seventh measure may be similarly calculated for one or more additional objects presented to the user, so that the user preference of all objects may be quantified and, if desired, ranked in an ascending or descending order.

It should be noted that above discussion of the calculation of the seven eye gaze measures based on just three gaze points was made merely to simplify comprehension. In practice, a greater number of gaze points on an object may be considered for each calculation, such as 4-10 gaze points, 11-20 gaze points, 21-30 gaze points, 31-40 gaze points, 41-50 gaze points, 51-60 gaze points, 61-70 gaze points, 71-80 gaze points, 81-90 gaze points, 91-100 gaze points, or even more.

Also, in practice, a vast number of gaze points are recorded by a typical eye tracker every second, and some consecutive gaze points may be identical or substantially the same—simply because the user's gaze has not substantially changed. Therefore, optionally, when calculating the second measure, only the first gaze point of a consecutive series of substantially similar gaze points may be considered. For example, if the series of substantially similar gaze points is:

|   | Point coordinates | Time stamp   |
|---|-------------------|--------------|
| 1 | 200, 300, 700     | 00:01:45.000 |
| 2 | 201, 298, 701     | 00:01:45.100 |
| 3 | 199, 301, 703     | 00:01:45.200 |
| 4 | 200, 299, 699     | 00:01:45.300 | and that series is followed by the following (clearly different) gaze point:

|   | Point coordinates | Time stamp   |
|---|-------------------|--------------|
| 5 | 230, 380, 400     | 00:01:45.400 | then points 1-4 may be regarded as a single point, whose coordinates are 200, 300, 700 (or some central tendency measure of the coordinates of points 1-4) and its time stamp is 00:01:45.000. Then, the speed of transition may be calculated just between that single point and point no. 5.

Reference is now made back to FIG. 2, step 206. Optionally, when calculating the user preference of an object, the total gaze time over that object may be explicitly ignored and not take part in the calculation. As discussed below in the Experimental Results section, total gaze time has been found, quite surprisingly, to be uncorrelated with user preference of objects. This surprising finding may enable performing the calculation of step 206 based on various lengths of gaze time over an object (translated to various numbers of gaze points on the object), and still obtain reliable results. For example, the calculated user preference of a certain cat character should be substantially the same whether the gaze points on that cat character were accumulated over a period of 2 seconds or over a period of 4 seconds. User preference may be reliably calculated based already on those first 2 seconds. This finding may be extremely beneficial when the software with visual output dictates that a certain object is presented only for a certain, limited, amount of time, and therefore step 206 can rely only on a limited number of gaze points over that object. Another benefit may arise when a certain object is presented for an extended duration (and the user similarly gazes at the object at length) by the software with visual output, but it is necessary or desired to draw a conclusion as to its preferability more quickly—for example in order to take an immediate, real time action in the pertinent software. Step 206, optionally, may be calculated based on gaze points collected over as little as 0.5 seconds of gaze time, as confirmed experimentally by the inventors.

Optionally, when a 3D display is concerned, step 206 also includes normalizing the distances of any of the measures (e.g., the distances between gaze points, the distances between the center of the object and the gaze points) to a distance between the center of the object and the user (approximately, between the user's eyes); this may also be referred to as a gaze ray length. This normalization may improve the pertinent measures, because it accounts for cases in which the user gazed at different objects from different (virtual) distances. The normalization may prevent a bias of the calculated user preference towards closer objects. To normalize distances associated with two or more objects, the distances of each object may be divided by that object's gaze ray length.

Optionally, step 206 also includes adjusting any of the calculated measures to the object's size, to account for cases in which different objects were of different sizes when the user gazed at them. Object size may be calculated in various different ways. For example, when a 2D display is concerned, object size may be calculated as the circumference of the object's 2D bounding box; when a 3D display is concerned, object size may be calculated as the perimeter of the object's bounding box. Those of skill in the art will recognize various other ways to calculate object size, such as calculations based on object area (2D), object volume (3D), etc.

Optionally, step 206 includes calculating at least one, two, three, four, five, or six of the seven measures, wherein each additional measure that is calculated may further enhance reliability of the user preference estimation. Optionally, the first measure is calculated in conjunction with the second, third, and/fourth measures which are related to it and may therefore enhance its reliability. Optionally, the fourth measure is calculated in conjunction with the fifth and/or sixth measures which are related to it and may therefore enhance its reliability.

Next, in a step 208, the user preference calculated in step 206 for one or multiple objects may be utilized for personalizing and/or otherwise enhancing the software with visual output. This step may be executed by module 106b of FIG. 1.

For example, in a computer game, steps 204 (eye tracking) and 206 (user preference calculation) may run constantly and repeatedly in the background, to estimate user preference of various objects presented in the visual output of the computer game. These could be game characters (human or not), characteristics of these characters (e.g., clothing, ethnicity, wearable or handheld accessories and weapons, etc.), as well as other objects unrelated to game characters (e.g., first aid kits, various packages, ammo, vehicles, etc.). Responsive to calculating a relatively high user preference for a certain object, the computer game may automatically select, offer, or present that certain objects or another object of the same visual characteristics. For instance, if it has been determined that the user has high preference for a certain shirt worn by other game characters (not the user's character), then such shirt may be automatically selected for the user during a game stage when the user is prompted to adjust the appearance and/or equipment of its character. Similarly, during such game stage, an offer to dress the user's character with that shirt may be provided, leaving the user the choice whether to accept it or not. Another option is to simply change the shirt of the user's characters to the preferred shirt immediately upon calculating that the user preference for that kind of shirt is high, during active game play and before reaching the game stage where appearance and/or equipment adjustment are normally made. Such uses of the calculated user preference may increase enjoyment of the user during game play. Also, in certain computer games the appearance and/or equipment adjustments require monetary purchases by the user. Being able to offer to the user those appearance characteristics and/or equipment which he or she were determined to prefer might increase purchases and yield higher profits to the developer of the game.

As another example, in a computerized learning software (sometimes referred to as an "e-learning software"), steps 204 (eye tracking) and 206 (user preference calculation) may run constantly and repeatedly in the background, to estimate user preference of various objects presented in the visual output of the learning software. These could be characters appearing in the visual output and acting to present and/or to demonstrate the learned subject matter to the user. For example, human characters, humanoid characters (such as animals or shapes with human characteristics), etc. In addition, in learning software that uses gamification of various learning tasks, the calculated user preference may be utilized in a similar manner to the previous example, relating to computer games. Such uses of the calculated user preference may increase enjoyment of the user during learning, and improve his or her engagement with the learning software and therefore their success.

As another example, in a computerized psychotherapy software, steps 204 (eye tracking) and 206 (user preference calculation) may run constantly and repeatedly in the background, to estimate user preference of various objects presented in the visual output of the psychotherapy software. These could be characters (e.g., human characters, humanoid characters) and/or inanimate objects appearing in the visual output and acting to create a therapeutic experience for the user. In addition, in psychotherapy software that uses gamification of certain aspects of therapy, the calculated user preference may be utilized in a similar manner to the previous example, relating to computer games. By personalizing the psychotherapy software to include more objects which the user prefers, at the expense of less preferable objects, the user may find the psychotherapy session with the software more pleasant and therefore more effective in improving various mood disorders.

In contrast, in psychotherapy software that is aimed at exposure therapy (exposing the patient to unpleasant and/or scary experiences in order to learn to overcome their negative influence), the calculated user preference may be utilized in an opposite manner: determining which objects are less preferred by the user (e.g., a veteran suffering from PTSD may have negative feelings towards every object relating to the military, such as uniformed soldiers, weapons, etc.) and then automatically selecting these objects for later presentation ("exposure"). This may be particularly useful if the source of the user's trauma is unclear, so it is not possible to manually define for the psychotherapy software which objects to expose the user to.

Another possible use of user preference calculation in the framework of psychotherapy software is to evaluate the progress and effect of psychotherapy during the execution of the software (and optionally over multiple different executions/sessions, such as on different times or days) by measuring the difference in user preference to the presented objects throughout the session(s). For example, if a user shows increasing preference of an object that is associated with some traumatic historical event, it can be assumed that psychotherapy is effective, and vice versa. Based on the same rationale, if the intention is to present to the user only or mainly highly-preferred objects, but user preference of them shows a decline, the psychotherapy software may be adjusted to abandon use of such objects and begin presenting other objects, hoping that they will be determined to be more preferred and/or effective in inducing therapy goals.

More generally, steps 204 (eye tracking) and 206 (user preference calculation) may run constantly and repeatedly in the background of any type of software that has visual output and is aimed at relieving stress, improving the mood of the user, distracting the user from uncomfortable medical procedures or other uncomfortable events, etc. The software may begin by presenting random objects to the user, and will gradually present more objects of the kind that was previously determined to be preferable by the user, and cease presenting objects which are less preferable (e.g., below a certain threshold).

Experimental Results

Extensive experimentation was performed by the inventor in order to find means for personalization and enhancement of displayed content, by developing an objective and quantitative method for the identification of subjective experience measures. The experiments focused on content displayed using a virtual reality (VR) headset, but their results are believed to apply to any type display.

The experiments aimed to test what eye tracking ("ET") measures could passively reflect individual experience measures in VR. A unique dynamic VR task was developed, during which participants explored the scene using body movements, head movements, and eye gaze. Participants were requested to observe moving (jumping) stimuli (objects) in order to generate a naturalistic viewing experience. The stimuli chosen for this task included pet characters and various inanimate shapes serving as controls. Following the viewing task, participants ranked their preference, valence, and arousal of the pets and control shapes they saw earlier. This task design allowed analyzing ET data collected while participants viewed stimuli in VR, and test the relation of ET data to subjective rankings.

In a pilot sample several gaze features were extracted. It was then determined that the later, main experiments should focus on the median distance of gaze from the center of the object while looking at an object, and the subjective preference and valence ranking, while accounting for object size and percent time gazed. In the main experiment the hypothesis for a significant positive correlation for the pets category of median distance measure with preferences and valence was confirmed. Further, a positive relation of a feature of the scan speed of gaze while looking at an object was found with preference and valence ranking.

The participants included in the experiments were healthy, with intact or corrected vision, between the ages of 18 and 40. The experiment exclusion criteria were: participants with dizziness, pregnant women, participants with eye-glasses only for near vision correction (not contact lenses; according to eye-tracker manufacture instructions), and participants who regularly consume anti-depressants or stimulants.

Experiments were initiated with a pilot sample of 23 valid participants. The pilot results were used to calculate the required sample size to achieve 80% power, a significant effect for the median distance of gaze feature (referred to as "the first measure" above, and denoted Med_Dist in this section) in the model for preference ranking. Power analysis resulted with a target sample of 53 participants with valid preference ranking.

In order to reach the planned sample size, a new sample of sixty-three (63) participants were recruited, of which six participants were excluded from any analyses due to various reasons. Three participants were excluded from the preference ranking analysis according to the ranking session exclusion criterion, to conclude with 53 participants with valid preference ranking. Eventually, both samples were combined for reassessment and analysis, and the following discussions refer to the joint sample, which consisted of a total 79 participants (42 females) in the age of (M=25.28, SD=4.17).

The VR task was performed using a commercial head mounted display (HMD) VR system (HTC-Vive), with a screen resolution of 1080×1200 pixels per eye and a 90 Hz refresh rate. The VR headset was adapted with a built-in binocular ET device (Tobii-installed) that provided pupil diameter data, eye gaze and head movement tracking while participants were engaged in VR. During the VR task, ET samples were recorded at a frequency of 120 Hz and a manufacturer-estimated accuracy of 0.5°. The VR task was programmed and developed in C #in Unity© 3D (version 2018.3) environment, and ran on a dedicated computer with a Core i7-7700K CPU at 4.20 GHz, 32.0 GB RAM, an NVIDIA GeForce GTX 1080 TI GPU, and a 64-bit Windows 10 operating system. The ET data acquisition was integrated in the task code and environment using Tobii's software development kit (SDK) for Unity and edited to fit the task design and specifications.

The VR scene was based on a scene from the Unity asset store, and consisted of a pastoral house which was imported to Unity© and modified to fit the purpose of the task. Some of the task stimuli were also downloaded and extracted out of packages available at the Unity asset store, and modified to fit the task purpose, and some stimuli were uniquely modeled in Blender and imported to and further designed in Unity. The participant control over the embedded task instructions in the VR, as well as the ranking selection during the ranking sessions, was performed by a trigger press on the VR controller.

The placement of the VR headset was followed by a first ET calibration, to ensure ET signals were recorded properly while participants were engaged in the VR task. The first part of the task was carried out while participants were standing, and they were instructed to explore a pastoral house using body posture and head movements within the VR environment. They were requested to search and look at the task stimuli consisting of animals (pets) and control objects (shapes) that appeared in pre-defined locations in the scene. In order to make the task closer to real-life viewing conditions and to enhance participant engagement and feeling of presence, the stimuli were jumping up and down, and therefore were distinguishable compared to the scene design furniture that were fixed. Once the objects were recognized, the participants were asked to look at them until they disappeared, and thereafter to continue to search and look at the next stimulus, and so forth.

The task included two consecutive runs, during which a total of 48 stimuli (24 pairs of animals and shapes) appeared at each run in a random order. Each pet and shape pair appeared in the same location in the scene and had resembling color and size. Each object remained visible in the scene for 2 seconds from the moment it was first identified by the ET. This resulted in equal exposure times for all objects to prevent the possible confound of the known mere exposure effect. The inter-trial interval (ITI) was at least 2 seconds, which was the time gap between the appearance of the next object after the previous object disappeared. In case the next object was not seen by the participants after 2 seconds from its appearance, a beep sound was played to inform the participants of that instance, and to keep them engaged in the task. The task began with 5 seconds of scene adaptation before any stimulus was first shown.

Following the above task, the participants ranked their preference of the stimuli they saw, and the valence and arousal levels they felt while they observed the stimuli, on a pseudo-continuous scale that contained unbeknownst to participants 37 bins. Therefore, the ranking score for each stimulus and for each ranking session consisted of numeric integer values in the range of 0 to 36. This part of the experiment was conducted while participants were seated and after a second ET calibration. In a preference ranking session the participants ranked how much they liked each object on a scale ranging from "do not like" to "very much like". In a valence ranking session the participants ranked how pleasantly they felt when they observed each object on a scale ranging from "very unpleasant" to "very pleasant". In the arousal ranking session the participants ranked the arousal level they felt when they observed each object on a scale ranging from "very unaroused" to "very aroused". Since preference was the main subjective measurement that the experiments aimed to test, it was the first to be ranked for all participants. Following that, the ranking order of arousal and valence was counterbalanced across participants. During each ranking session, each stimulus was presented and ranked solely with the same neutral pastoral background, in a sequential random order with an ITI of 2 seconds. In each ranking trial, the ranking scale appeared 2 seconds after the stimulus was identified as viewed by the participants, which resulted with additional identical exposure time to prevent the possible confound of the mere exposure effect also in the ranking phase. The selection of the ranking level was conducted in an engaging fashion, as the controller in the participant hand radiated a green "laser beam", which colored the scale location pointed at in green as well. Finally, ranking was chosen by a trigger press while the scale region of interest was pointed at and marked in green.

Each ET data sample collected during the VR task included measurements of: gazed ray origin (x,y,z), gazed ray direction (x,y,z), headset position origin (x,y,z), headset position direction (x,y,z), pupil diameter (mm), sample validity defined by the ET, and a time stamp in millisecond precision. The time stamp allowed synchronization of the ET data with the task timeline, gazed object name, gazed object center position (x,y,z) (which was considered to be the center of the object's bounding box), and the gazed ray hit point (x,y,z) (which is the location of collision of the gaze ray with the gazed object). Some of these measures were used for trial validity analysis and feature extraction.

Preprocessing of eye-tracking signals was programmed with Python 3.6 software. ET samples with null values or non-valid samples were treated as blinks. Also considered as blinks were all samples in a 150 millisecond time windows before each blink onset and after each blink offset. All blink samples were discarded before the analysis. Included in the analysis were only trials in which at least 50% of ET samples that consisted of valid values, and that the stimulus gazed time was at least 50% of the 2 seconds it was presented from the first gaze time. Participants with less than 50% of valid trials according to these criteria were excluded from further ET analysis.

Valid ranking data for each of the ranking sessions was defined as having a minimal standard deviation (SD) of 4 (bins) for the pets objects (since the power analysis registered was focused on a model for pets, and as the ranking SD of the shapes was expected to be lower than that of the pets due to their closer similarity to each other and simple appearance). Data collection was stopped once reaching a sample of 53 participants with both valid eye-tracking data, and valid preference ranking data out of which at least 10 participants had valid valence ranking data, to match the power analysis minimal sample size for the model for valence.

Several eye-tracking features were calculated for each trial after data preprocessing. Calculated features includes: percent time the object was gazed out of the time it was presented; gaze shift distance percentiles (10,50,95) that is defined as the distance between the gazed hit point to the centroid of the gazed object (for this measure the x,y,z and the Euclidian distance was calculated), (the $50^{th}$ percentile of this measure is Med_Dist); the difference in time between the gaze shift distance percentiles (10,50,95); scan speed percentiles (10,50,95) were defined as the gaze scan Euclidian distance per time unit. For each feature the mean value for the two runs was considered for further analysis.

The aforementioned features and some features associated therewith are listed in the following table:

| | Feature | Fixed effect estimate | Fixed effect P value | Fixed effect P value Corrected (3*12 tests) |
|---|---|---|---|---|
| 1 | Med_Dist | 1.83E−01 | 2.16E−12 | 7.78E−11 |
| 2 | Min_Per_Dist | 8.32E−02 | 1.00E−03 | 3.60E−02 |
| 3 | Max_Per_Dist | 1.61E−01 | 1.12E−10 | 4.03E−09 |
| 4 | Med_diff_Dist | 1.22E−01 | 1.10E−07 | 3.96E−06 |
| 5 | Min_Per_Diff_Dist | 9.40E−02 | 1.49E−04 | 5.36E−03 |
| 6 | Max_Per_Diff_Dist | 1.04E−01 | 7.97E−07 | 2.87E−05 |
| 7 | Med_scan_speed | 1.80E−01 | 3.11E−13 | 1.12E−11 |
| 8 | Min_Per_scan_speed | 1.42E−01 | 7.50E−11 | 2.70E−09 |
| 9 | Max_Per_scan_speed | 9.14E−02 | 2.63E−06 | 9.47E−05 |

In the above table, lines 1-7 correspond to the first through seventh measure discussed in the above detailed description, respectively. Lines 8-9 refer to two measures that are related to the seventh measure, in that they are the minimal and maximal speeds of transition, respectively, between temporally-consecutive ones of the points of the eye gaze. The 'minimal' speed may also be more broadly defined as the speed at a relatively low percentile of the speeds of transition, such as a percentile equal to or lower than the $15^{th}$; similarly, the 'maximal' speed may also be more broadly defined as the speed at a relatively high percentile of the aforementioned speeds of transition, such as a percentile equal to or larger than the 85th. In the measures of lines 8-9, a higher minimal/maximal speed indicates stronger user preference, and vice versa.

An additional measure for object size was considered as a possible confound for the extracted ET features. This measure was the circumference of the bounding box that surrounded each object. This measure was referred as DIM_SUM.

The relation of all the detailed extracted ET features to subjective experience measures was assessed by the results of a mixed linear regression model, where the ranking value was the dependent variable, and the independent variables were the ET features adjusted for the object sizes and interacted by the viewed object type (pet vs. shape), where participants were considered as random effects.

Since preference was the measure of main interest, the analysis focused on regression model results of the preference ranking for the purpose of feature selection. To include the possibilities of both similar and different effects according to objects type, the selection criteria accounted for the fixed effect and the interaction terms in the mixed linear models by choosing the conjugation of the features with the smallest p value according to each of these effects.

Out of the features extracted, the Med_scan_speed was the first, and the Med_Dist feature was the second and third from top according to the features selection criteria. Therefore, these features were the focus of continued analyses.

The relation of the Med_Dist feature to preference and valence rankings was calculated based on the gaze shift distance, noted as $d_i$ for the $i^{th}$ time point, which was defined as the 3D Euclidian distance between the gaze point (also "gazed hit point") $h_i$ for the $i^{th}$ time point and the centroid of the gazed object o, where:

$$d_i = \text{Euqlidean Distance}(h_i, o) \qquad (1)$$

The center of each object's bounding box was considered as its 3D centroid, denoted as o. The $50^{th}$ percentile of the gaze shift distances obtained in each trial was denoted the median gaze distance, and abbreviated Med_Dist:

$$\text{Med\_Dist}_{trial} = \text{Median}(d_i)_{i \in trial} \qquad (2)$$

The gazed time was defined as the percentage of time the object was gazed at out of the total time it was presented (2 s). This feature was used to account for trial and participant data validity as described.

Scan speed was defined as the gaze scan distance per time unit. Therefore, this feature was based on the distance, noted as $s_i$, of the location of two time-consecutive gazed hit points $h_i$ and $h_{i+1}$ for the $i^{th}$ and the i+1 time points, such that:

$$s_i = \text{Euqlidean Distance}(h_i, h_{i+i}) \qquad (3)$$

Since $s_i$ was calculated per each two time-consecutive ET data samples, the corresponding time difference for all time points equaled to 8.3 milliseconds based on the 120 Hz ET sampling frequency, resulting in a scaled measure for speed. The $50^{th}$ percentile of the scan speed per trial, is referred as Scan_Speed:

$$\text{Scan\_Speed}_{trial} = \text{Median}(s_i)_{i \in trial} \qquad (4)$$

Time samples for which $d_i$ was greater than the maximal euqlidean distance obtainable for the object were considered as measurement errors and excluded from further analysis.

Statistical analysis was done with R software. All ET features were standardized before the regression models were performed, and values greater than or smaller than 3 standard deviations from the mean were treated as outliers and were removed from the analysis. The standard p value of 0.05 criterion was used for assessing the significance of each effect. For each feature, the mean value for the two runs was calculated and used for all analyses.

For the final sample of 79 valid participants, 8.2% of the trials were excluded due to less than 50% of the object gaze time, out of which 0.7% of the trials were excluded due to less than 50% valid values. All participants had more than 50% valid trials, and hence were valid by means of ET data.

During the VR task, the duration it took the participants to find the animated shapes since they first appeared in the scene was (M=1.8 s, SD=1.1 s), which was slightly but significantly longer (in 0.1 s) than the time it took to find their paired pets (M=1.7 s, SD=1.2 s) across all participants (t [23]=−2.8, p=0.01, linear mixed model). This time interval was defined as the participants' reaction time (RT). The small difference between the object types (0.1 s) in RT could derive from a closer appearance proximity of the shapes to the scene furniture than that of the pets.

Participants were instructed to look at the appearing stimuli from the moment they were first observed and until they disappeared. Nevertheless, it was found that the percent gazed time was significantly longer by 5.4% for pets (M=87.27%, SD=12.38%) than for their paired control shapes (M=82.37%, SD=15.19%) across all participants (t[29.9]=4.9, p=2.5e-5, linear mixed model). Therefore, the percent of gazed time was added as an additional independent variable to all subsequent ranking models in order to account for a possible influence of time exposure on objects liking known as the mere exposure effect.

The ranking sessions validity criterion yielded a number of 75, 77, and 66 participants with valid ranking data for the preference, valence and arousal rankings, respectively, hence these are the sample sizes that were used for their corresponding analyses.

Figure 7:
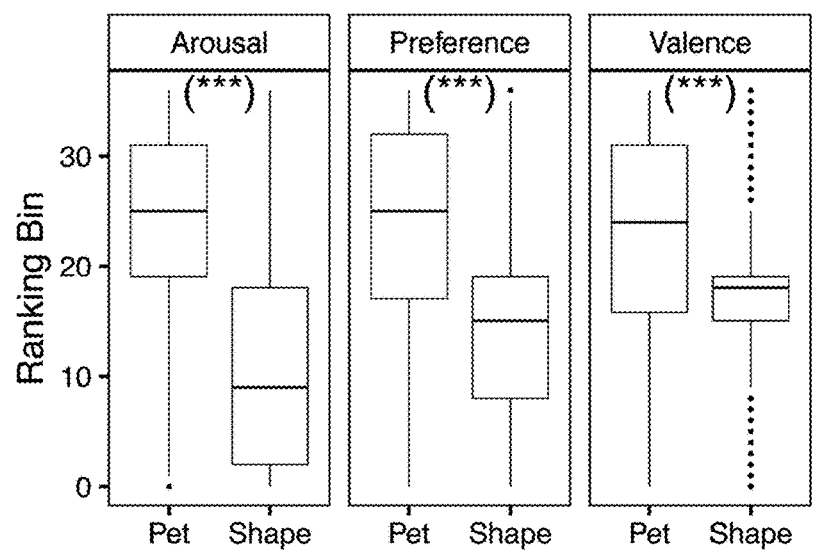
FIG. 7 is a boxplot of showing experimental results relating to object rankings of arousal, preference, and valence.

The preference, valence, and arousal rankings consisted of significantly higher values for pets than for their paired control shapes. See FIG. 7, which is a boxplot of the objects rankings of arousal, preference and valence, where p<0.001 is indicated by '***'. Bonferroni correction for 3 tests in 3 mixed linear regressions found a significant difference of 24% of scale range in the pets preference ranking compared to shapes (t[55.8]=6.37, p=1.14e-07); a significant difference of 14% of scale range in the pets valence ranking compared to shapes (t[35.3]=4, p=8.47e-4); and a significant difference of 35% of scale range in the pets arousal ranking compared to shapes (t[76.5]=12.87, p=2.3e-20). The gazed time added to the model did not have a significant effect on any of the rankings (p>0.4 in all models for the effect of gazed time).

The median distance of gaze (Med_Dist) was significantly higher for pets relative to their paired control shapes across all participants (t[22]=2.67, p=0.028, mixed linear regression, adjusted for gazed time and object size. This feature represents a measure for how far the participants scan the stimuli away from their center. This difference could be influenced by the greater complexity and interest of the pets in regions proximal to bounds relative to the shapes. The gazed time had no effect on the Med_Dist values (t[1774]=−2, p=0.08, mixed linear regression).

A similar trend was found for the median scan speed feature, referred to as Scan_Speed, where significantly higher values for pets were obtained relative to their paired control shapes across all participants (t[54.2]=5.47, p=2.3e-06, mixed linear regression, adjusted for gazed time and objects size, FIG. 5). This difference of higher Scan_Speed when looking at pets vs shapes could be derived from trying to extract more details that are present in the pets relative to shapes at a given time period. Unlike the Med_Dist, the paired difference in Scan_Speed was negatively influenced by the gazed time (t[21. 4]=−4.1, p=8.6e-4, mixed linear regression). This could result from an attempt to compensate higher scan speed for less time of viewing an object. These ET results were Bonferroni corrected for 2 features. These results suggest that there is a characteristic difference in gaze patterns when looking at shapes vs. pets.

Figure 8:
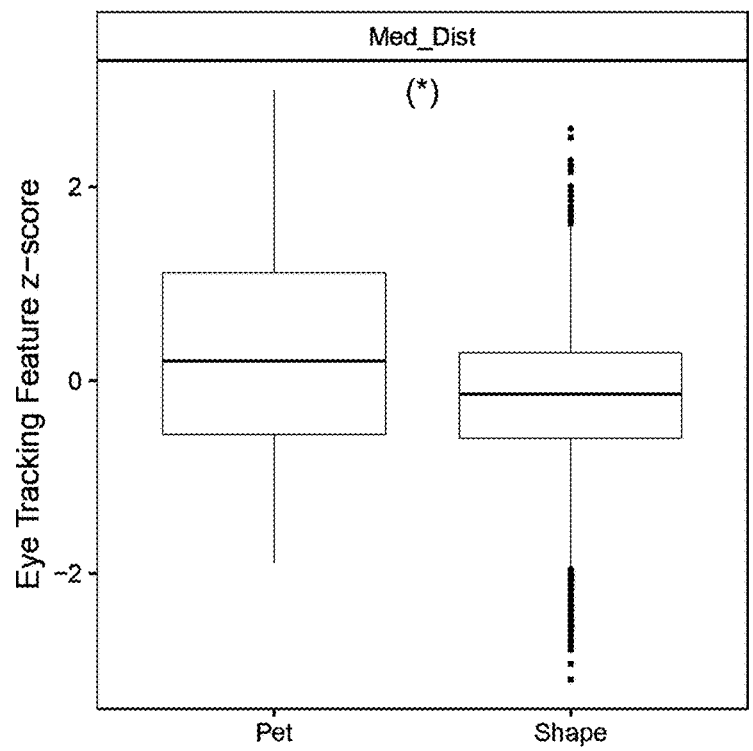
FIG. 8 is a boxplot showing experimental results relating to a Med_Dist eye-tracking feature.
Figure 9:
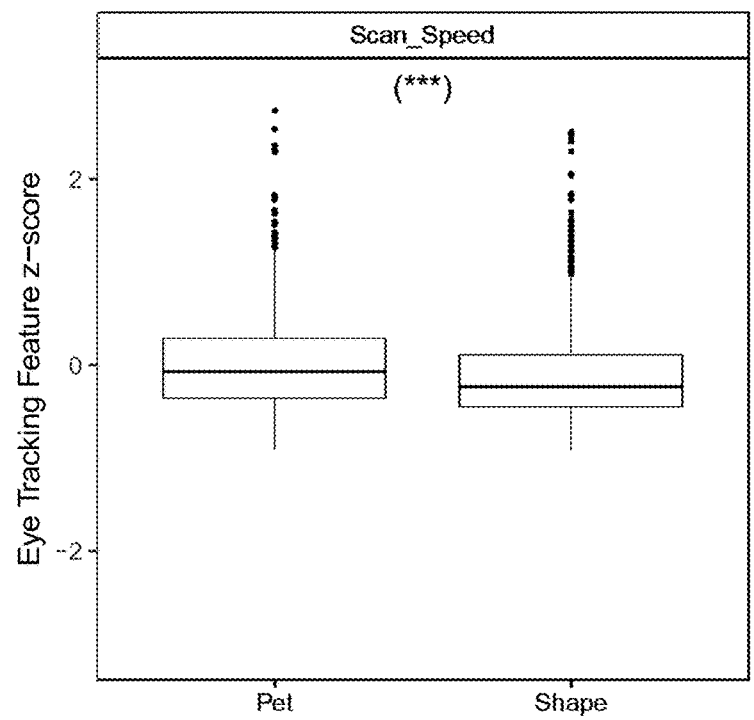
FIG. 9 is a boxplot showing experimental results relating to a Scan_Speed eye-tracking feature.

FIGS. 8 and 9 show boxplots of eye-tracking features Med_Dist and Scan_Speed, respectively, according to object type (pets and shapes). For each box, the central horizontal line denotes the median; the lower and upper borders of the box indicate the $25^{th}$ and the $75^{th}$ percentile of each distribution, respectively; the whiskers denote the minimum and maximum values that are 1.5 interquartile range from the 25th and 75th percentile, respectively; and the dots denote values outside the whiskers range. Significance is noted for the tests for the difference in each measure for pairs of pets and shapes using a linear mixed model adjusted for the gazed time and objects size. Bonferroni correction for the 2 features found a significant paired difference for both Med_Dist and Scan_Speed features (where p<0.001 is denoted by '***', and p<0.05 is denoted by '*').

Since a significant difference in the pets gazed time relative to shapes was found, the hypotheses of this relation was tested by a mixed linear model adjusting for gazed time as well in order to control for the possible mere exposure effect. The model included object type interaction as well, and the participants are modeled as random effects. An interaction of Med_Dist and type was found in both models, with (t[106.4]=−4.9, p=2.6e-4), and (t[222.2]=−6.2, p=2e-7) for the preference and the valence respectively (Bonferroni corrected for 3*32 tests). In addition, a significant positive relation between Med_Dist and the preference and the valence rankings of pets type was obtained in agreement with the hypotheses, with (beta=0.18, t[70.4]=4.6, p=0.0016), and (beta=0.25, t[105]=7.4, p=3.3e-9) respectively (Bonferroni corrected for 3*32 tests). This implies that the furthest away from the center of a pet the participants fixated upon, the more they liked it, and the more pleasant they felt while looking at it.

Even though not specifically hypothesized, this interaction was additionally tested for the arousal rankings, and it was not significant (t[606]=1.6, p=1, Bonferroni corrected for 3*32 tests). As to a relation of Med_Dist to arousal ranking, a negative relation without interaction with type was obtained (beta=−0.13, t[581]=−5.5, p=5.3e-6, Bonferroni corrected for 3*32 tests).

The gazed time had no effect on the rankings in these models (p, for both main effect and interaction with type in all these models).

The relation between Scan_Speed and subjective rankings was tested using linear mixed models adjusted for objects size and gazed time, including objects type interactions, where participants were considered as random effects (Bonferroni corrected for 3*32 tests). Significant interaction was found between the relation of Scan_Speed to rankings and object type (t[83]=−5.6, p=2.88e-5) and (t[75.5]=−6.6, p=5.3e-7) for preference and valence, respectively. The pets objects type obtained a significant positive relation of Scan_Speed to preference and valence ranking (beta=0.19, t[68.3]=6.2, p=4.1e-6) and (beta=0.28, t[66.7]=6.9, p=2.1e-7) respectively, while no relation was obtained for the shapes type (p=1 for both). These results suggest that the faster participants scanned the pets with their gaze, the more they liked them, and the more pleasant they felt while looking at them.

Figure 10A:
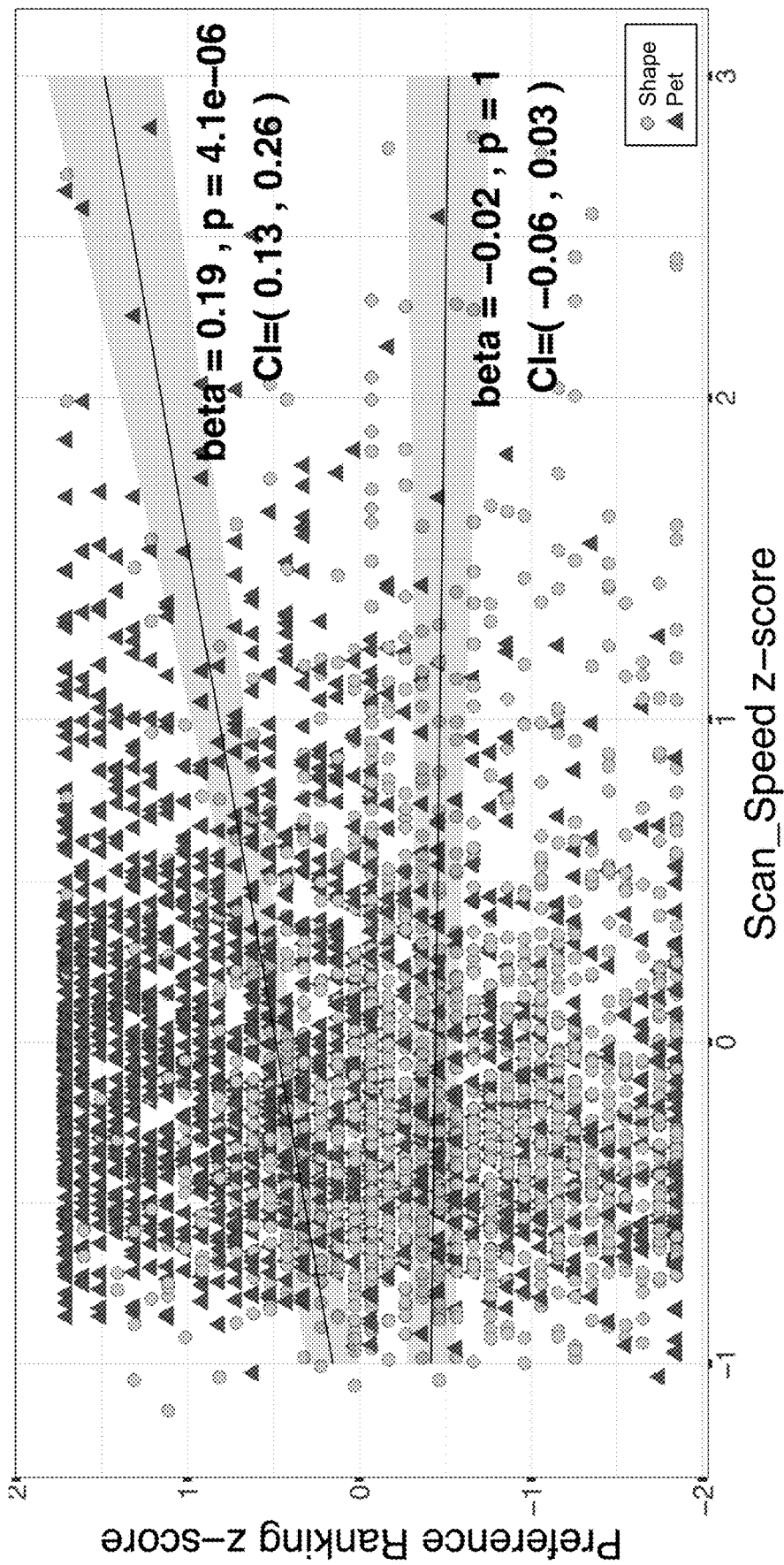
FIGS. 10A, 10B, and 10C show scatter plots of subjective rankings as a function of Scan_Speed per subject per object, and predicted preference, valence, and arousal values, respectively, as a function of Scan_Speed for each object type.
Figure 10B:
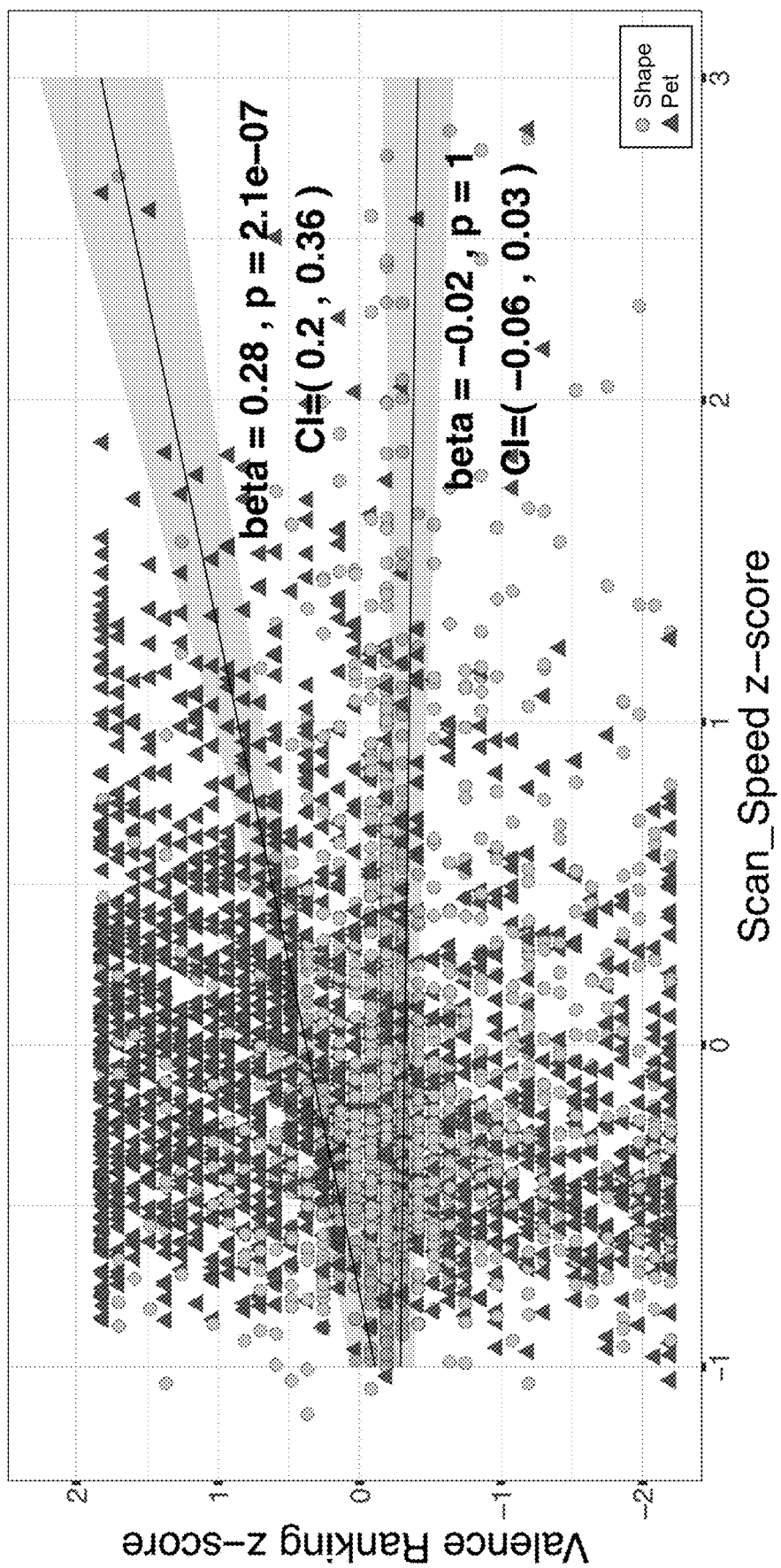
Figure 10C:
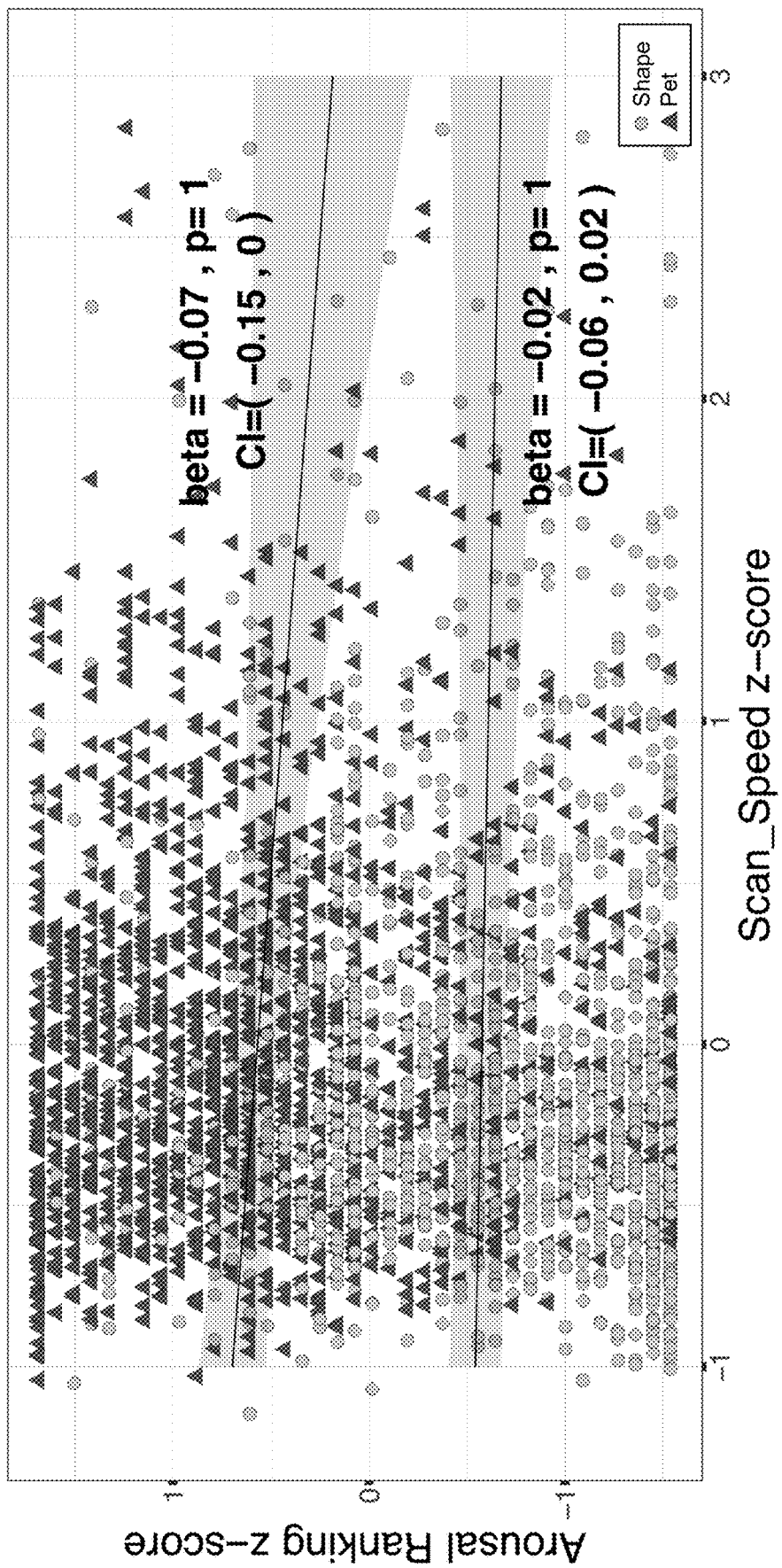

FIGS. 10A, 10B, and 10C show scatter plots of the subjective rankings as a function of Scan_Speed per subject per object, and the preference, valence, and arousal values, respectively predicted by the linear models of rankings as a function of Scan_Speed for each object type (pets in triangles and shapes in circles; fitted lines are surrounded by gray polygons of the 95% confidence interval). FIG. 10A shows preference ranking as a function of Scan_Speed. A significant interaction of type was obtained (beta=−0.2, t[83]=−5.6, p=2.88e-5), CI=(−0.28,−0.14)) as described by a significant positive slope only for the pets in the plot. FIG. 10B shows valence ranking as a function of Scan_Speed. A significant interaction of type was obtained (beta=−0.3, t[75.5]=−6.6, p=5.3e-7, CI=(−0.39,−0.21)) as described by a significant positive slope only for the pets in the plot. FIG. 10C shows arousal ranking as a function of Scan_Speed. Type interaction was not found for arousal ranking (beta=0.05, t[53.3]=1.2, p=1, CI=(−0.03,0.14)) as described with two non-significant slopes for both types in the plot. All variables in 10A, 10B, and 10C are z-scored; all tests are Bonferroni corrected for 3*32 ranking times the number of features=96 tests).

As for the arousal rankings, the Scan_Speed feature did not have a significant interaction with type (t[53.3]=1.2,p=1) nor a significant main effect (t[53]=−1.9,p=1).

The gazed time had no effect on the rankings in these models (p=1 for both main effect and interaction with type in all these models).

The underlying assumption in pairing a control shape to each pet was that they will be ranked differently, despite their shared color, size, and position in the scene. As detailed above, a significant positive relation was found between Med_Dist and Scan_Speed to pets preference and valence rankings accompanied by a significant interaction with type, and a significant paired difference of these rankings and ET measures. Therefore, it was further speculated whether the paired difference in these ET measures is related to the paired ranking difference. This was tested with a mixed linear regression fitted to the paired ranking difference, with the paired difference in Med_Dist and Scan_Speed as independent variables adjusted for the paired difference in size and gazed time. After Bonferroni correction for 2 rankings, it was found that the paired difference in the Scan_Speed was positively related to the paired difference in ranking, with (beta=0.12, t[15.3]=3.6, p=0.005) and (beta=0.14, t[15.4]=3.8, p=0.003) for preference and valence rankings, respectively. Nevertheless, the paired difference in Med_Dist was not correlated with the paired difference in ranking (t[16.7]=−1.2, p=0.5) and (t[17.5]=−1.3, p=0.4) for preference and valence ranking respectively. No relation was found for both paired differences in gazed time and in objects size to the paired ranking difference (p>0.27 for all). These results suggest that the higher the difference in the characteristic scan speed of pets relative to their control shapes, the greater the subjective difference in their liking and in the pleasantness that participants felt while looking at them.

To conclude, the experiments included 3D gaze behavior analysis while viewing moving objects in a VR environment, and found that the larger the scanned distance from the center of the object and the scan speed of a single object, the greater the preference towards this object. Two stimuli categories of pets and of shapes were compared, controlling for color, size, and scene position of the pets. Multiple gaze features were tested, and following preference-targeted feature selection, two features were in focus and obtained a positive correlation between both ET features and the subjective ranking of preference as well as the valence of the viewed pets. These results suggest that ET measures extracted during passive viewing of objects may be used as digital biomarkers for inference of subjective preference and pleasantness induced while they are observed.

A positive relation of these ET features to preference and valence ranking was found within the pets category only. A possible explanation for this interaction with object category is the greater number of salient details in pets, that could contribute to a greater diversity in gaze behavior in this category compared to their control simple shapes.

It was previously shown that object size is not related to affective preferences when examined in a controlled fashion, and evidence further shows that preference of different stimuli categories was affected by different visual attributes. Therefore, since both the gaze distance from the center of the object and the scan of the object could have been influenced by the object size, the objects' circumference was included as a measure for its size to all the mixed linear models for rankings prediction. It was found that both ET features of Med_Dist and Scan_Speed were positively related to pet preference and valence ranking adjusted for the stimuli size.

The positive correlation between both Med_Dist and Scan_Speed features, the median distance of gaze from the center of the object, and the median gaze scan speed, to subjective ranking, was demonstrated from several perspectives. First, these ET features had higher values for the pets relative to their control shapes that were also ranked higher for the measures of preference, valence, and arousal. A positive relation was found between the difference in Scan_Speed of pairs of pets and their control shapes and the corresponding difference in their preference and valence ranking, in which the percent gazed time had no effect.

While some prior work examined gaze and preferences during active choice of objects, in this study it was set to investigate passive gaze behavior patterns with the purpose of detecting subjective experience. Therefore, the task was designed to simulate spontaneous viewing as often encountered in daily life, which includes passive data gathering on objects presented one at a time, without necessarily applying an immediate choice or action (which might lead to some subjective preference, whether overt or covert). Since each stimulus was presented individually, the identity of the first and last gazed stimulus was known and determined by the code's random presentation order. Moreover, the amount of time an object was gazed at was found not only to be influenced by, but also to influence its preference, and is known as the "mere exposure effect." At an attempt to control for this possible confound in the current task, all participants were instructed to look at each stimulus from the moment it was first noticed and until it disappeared, which resulted in an identical exposure duration for all stimuli; a small but significant difference was obtained between the percent time the pets were gazed relative to their control shapes. For this reason, this variable was added to the above-mentioned models, and the clear finding was it had no relation to preference or any of the other ranking measures.

In contrary to the positive relation found for the Med_Dist feature to pet preference and valence rankings, a negative relation was obtained for the both the pets and shapes arousal rankings. While this result was initially surprising, when the identity of the objects that were mostly ranked to induce high arousal levels was examined in depth, it was revealed that they were all also ranked with low valence (and low preference for the pets in this group), hence generating the opposing trend for the pets group.

Many ET studies thus far were done on sedentary tasks and in front of a 2D screen, sometimes even with the addition of a chinrest, to ensure all participants look at the screen from the same point of view. However, in many natural gaze tasks people encounter, they look at objects from different points of view and even during movement. In the current study, even though all stimuli appear at the same locations for all participants, since they appear in a random and therefore different order they are observed from possibly slightly different angles, points of view and perspectives due to individual body, head, and eye movements prior to the stimuli appearance. As a result, participants might not all look at the exact same coordinates on all stimuli. For this reason, extracting global features for spatial dynamics of eye scan of objects as performed here is more compatible than a coordinate-wise fixation location analysis usually done in 2D. Notwithstanding that this diversity adds variance to the data, it also allows experimenting in a more natural fashion, close to how users engage environments in real life.

Finally, the findings made here suggest that ET measures may passively reflect an individual's internal preference and mental state, which could be used for content personalization, either with or without additional physiological signals, via real time update of video outputs for purposes such as research, gaming, learning, or therapy.

Any parameter, method, action, step, algorithm, limitation, etc. discussed in the above Experimental Results section is considered an optional part of embodiments of the invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range— 10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:

a display;

an eye tracker;

at least one hardware processor; and a non-transitory computer-readable storage medium having program code embodied therewith, the program code executable by the at least one hardware processor to:

operate the display to present multiple objects to a user, operate the eye tracker to track an eye gaze of the user during the presentation of the multiple objects, and calculate an estimated user preference of each of the multiple objects, by performing at least one of:

(a) calculating a measure of central tendency of distances from a center of the respective object to points of the eye gaze on the respective object, wherein a higher measure of central tendency of the distances indicates a stronger user preference and vice versa, or (b) calculating a measure of central tendency of speeds of transition between temporally-consecutive ones of the points of the eye gaze, wherein a higher measure of central tendency of the speeds indicates a stronger user preference and vice versa.

2. The system of claim 1, wherein the program code is further executable by the at least one hardware processor to:
run a computer game;
operate the display to present video output of the computer game, wherein the multiple objects are part of the computer game; and
personalize the computer game to the user by utilizing the estimated user preference of each of the multiple objects to select, offer, or present those of the multiple objects having a high estimated user preference relative to other ones of the multiple objects.

3. The system of claim 1, wherein the program code is further executable by the at least one hardware processor to:
run a computerized learning software;
operate the display to present video output of the computerized learning software, wherein the multiple objects are part of the computerized learning software; and
personalize the computerized learning software to the user by utilizing the estimated user preference of each of the multiple objects to select, offer, or present those of the multiple objects having a high estimated user preference relative to other ones of the multiple objects.

4. The system of claim 1, wherein the program code is further executable by the at least one hardware processor to:
run a computerized psychotherapy software;
operate the display to present video output of the computerized psychotherapy software, wherein the multiple objects are part of the computerized psychotherapy software; and
personalize the computerized psychotherapy software to the user by utilizing the estimated user preference of each of the multiple objects to select, offer, or present those of the multiple objects having a high estimated user preference relative to other ones of the multiple objects.

5. The system of claim 1, wherein each of the measures of central tendency of (a) and (b) is selected from the group consisting of: mean, median, and mode.

6. The system of claim 1, wherein the display is selected from the group consisting of: a three-dimensional display, and a two-dimensional display.

7. The system of claim 1, wherein the objects are selected from the group consisting of: human characters, non-human characters, and inanimate items.

8. A computer-implemented method comprising:
automatically operating a display to present multiple objects to a user;
automatically operating an eye tracker to track an eye gaze of the user during the presentation of the multiple objects; and
automatically calculating an estimated user preference of each of the multiple objects, by performing at least one of:
(a) calculating a measure of central tendency of distances from a center of the respective object to points of the eye gaze on the respective object, wherein a higher measure of central tendency of the distances indicates a stronger user preference and vice versa, or
(b) calculating a measure of central tendency of speeds of transition between temporally-consecutive ones of the points of the eye gaze, wherein a higher measure of central tendency of the speeds indicates a stronger user preference and vice versa.

9. The method of claim 8, further comprising:
automatically running a computer game;
automatically operating the display to present video output of the computer game, wherein the multiple objects are part of the computer game; and
automatically personalizing the computer game to the user by utilizing the estimated user preference of each of the multiple objects to select, offer, or present those of the multiple objects having a high estimated user preference relative to other ones of the multiple objects.

10. The method of claim 8, further comprising:
automatically running a computerized learning software;
automatically operating the display to present video output of the computerized learning software, wherein the multiple objects are part of the computerized learning software; and
automatically personalizing the computerized learning software to the user by utilizing the estimated user preference of each of the multiple objects to select, offer, or present those of the multiple objects having a high estimated user preference relative to other ones of the multiple objects.

11. The method of claim 8, further comprising:
automatically running a computerized psychotherapy software;
automatically operating the display to present video output of the computerized psychotherapy software, wherein the multiple objects are part of the computerized psychotherapy software; and
automatically personalizing the computerized psychotherapy software to the user by utilizing the estimated user preference of each of the multiple objects to select, offer, or present those of the multiple objects having a high estimated user preference relative to other ones of the multiple objects.

12. The method of claim 8, wherein each of the measures of central tendency of (a) and (b) is selected from the group consisting of: mean, median, and mode.

13. The method of claim 8, wherein the display is selected from the group consisting of: a three-dimensional display, and a two-dimensional display.

14. The method of claim 8, wherein the objects are selected from the group consisting of: human characters, non-human characters, and inanimate items.

15. A computer program product comprising a non-transitory computer-readable storage medium having program code embodied therewith, the program code executable by at least one hardware processor to:
operate a display to present multiple objects to a user,
operate an eye tracker to track an eye gaze of the user during the presentation of the multiple objects,
calculate an estimated user preference of each of the multiple objects, by performing at least one of:
(a) calculating a measure of central tendency of distances from a center of the respective object to points of the eye gaze on the respective object, wherein a higher measure of central tendency of the distances indicates a stronger user preference and vice versa, or
(b) calculating a measure of central tendency of speeds of transition between temporally-consecutive ones of the points of the eye gaze, wherein a higher measure of central tendency of the speeds indicates a stronger user preference and vice versa.

16. The computer program product of claim 15, wherein the program code is further executable by the at least one hardware processor to:
- run a computer game;
- operate the display to present video output of the computer game, wherein the multiple objects are part of the computer game; and
- personalize the computer game to the user by utilizing the estimated user preference of each of the multiple objects to select, offer, or present those of the multiple objects having a high estimated user preference relative to other ones of the multiple objects.

17. The computer program product of claim 15, wherein the program code is further executable by the at least one hardware processor to:
- run a computerized learning software;
- operate the display to present video output of the computerized learning software, wherein the multiple objects are part of the computerized learning software; and
- personalize the computerized learning software to the user by utilizing the estimated user preference of each of the multiple objects to select, offer, or present those of the multiple objects having a high estimated user preference relative to other ones of the multiple objects.

18. The computer program product of claim 15, wherein the program code is further executable by the at least one hardware processor to:
- run a computerized psychotherapy software;
- operate the display to present video output of the computerized psychotherapy software, wherein the multiple objects are part of the computerized psychotherapy software; and
- personalize the computerized psychotherapy software to the user by utilizing the estimated user preference of each of the multiple objects to select, offer, or present those of the multiple objects having a high estimated user preference relative to other ones of the multiple objects.

19. The computer program product of claim 15, wherein each of the measures of central tendency of (a) and (b) is selected from the group consisting of: mean, median, and mode.

20. The computer program product of claim 15, wherein the display is selected from the group consisting of: a three-dimensional display, and a two-dimensional display.

* * * * *